(12) United States Patent
Nagai et al.

(10) Patent No.: US 9,746,681 B2
(45) Date of Patent: Aug. 29, 2017

(54) LASER BEAM COMBINING DEVICE

(71) Applicant: KAWASAKI JUKOGYO KABUSHIKI KAISHA, Kobe-shi, Hyogo (JP)

(72) Inventors: Toru Nagai, Kakamigahara (JP); Fumio Wani, Konan (JP); Ryuji Nagaoka, Kakamigahara (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 15/033,441

(22) PCT Filed: Oct. 6, 2014

(86) PCT No.: PCT/JP2014/005084
§ 371 (c)(1),
(2) Date: Apr. 29, 2016

(87) PCT Pub. No.: WO2015/064017
PCT Pub. Date: May 7, 2015

(65) Prior Publication Data
US 2016/0274369 A1     Sep. 22, 2016

(30) Foreign Application Priority Data

Oct. 29, 2013   (JP) ................................ 2013-224638

(51) Int. Cl.
| | |
|---|---|
| *G02B 27/14* | (2006.01) |
| *G02B 27/12* | (2006.01) |
| *G02B 17/06* | (2006.01) |
| *G02B 5/00* | (2006.01) |
| *G02B 27/10* | (2006.01) |

(Continued)

(52) U.S. Cl.
CPC ............. *G02B 27/14* (2013.01); *G02B 5/001* (2013.01); *G02B 17/061* (2013.01); *G02B 27/1006* (2013.01); *H01S 3/0071* (2013.01); *H01S 3/005* (2013.01); *H01S 3/2383* (2013.01)

(58) Field of Classification Search
USPC .................................................. 359/619–629
See application file for complete search history.

(56) References Cited

U.S. PATENT DOCUMENTS

2010/0288740 A1* 11/2010 Komiya ............... G02B 26/101
                                                                219/121.67

FOREIGN PATENT DOCUMENTS

| EP | 2342596 B1 | 4/2013 |
|---|---|---|
| JP | S60-153024 A | 8/1985 |

(Continued)

OTHER PUBLICATIONS

Dec. 22, 2014 Search Report issued in International Patent Application No. PCT/JP2014/005084.

(Continued)

*Primary Examiner* — Brandi Thomas
(74) *Attorney, Agent, or Firm* — Oliff PLC

(57) ABSTRACT

A laser beam combining device includes: a plurality of shaping optical units which emit circular laser beams which are different from each other in a change amount of an outer diameter per unit travel distance, wherein the plurality of shaping optical units are placed in such a manner that the circular laser beams emitted from the shaping optical units have a concentric shape.

16 Claims, 14 Drawing Sheets

(51) Int. Cl.
 *H01S 3/23* (2006.01)
 *H01S 3/00* (2006.01)

(56) References Cited

FOREIGN PATENT DOCUMENTS

JP       H05-111786 A    5/1993
JP        H09-43537 A    2/1997

OTHER PUBLICATIONS

May 3, 2016 Translation of the International Preliminary Report on Patentability issued in International Patent Application No. PCT/JP2014/005084.
Jun. 26, 2017 Search Report issued in European Application No. 14857042.7.

* cited by examiner

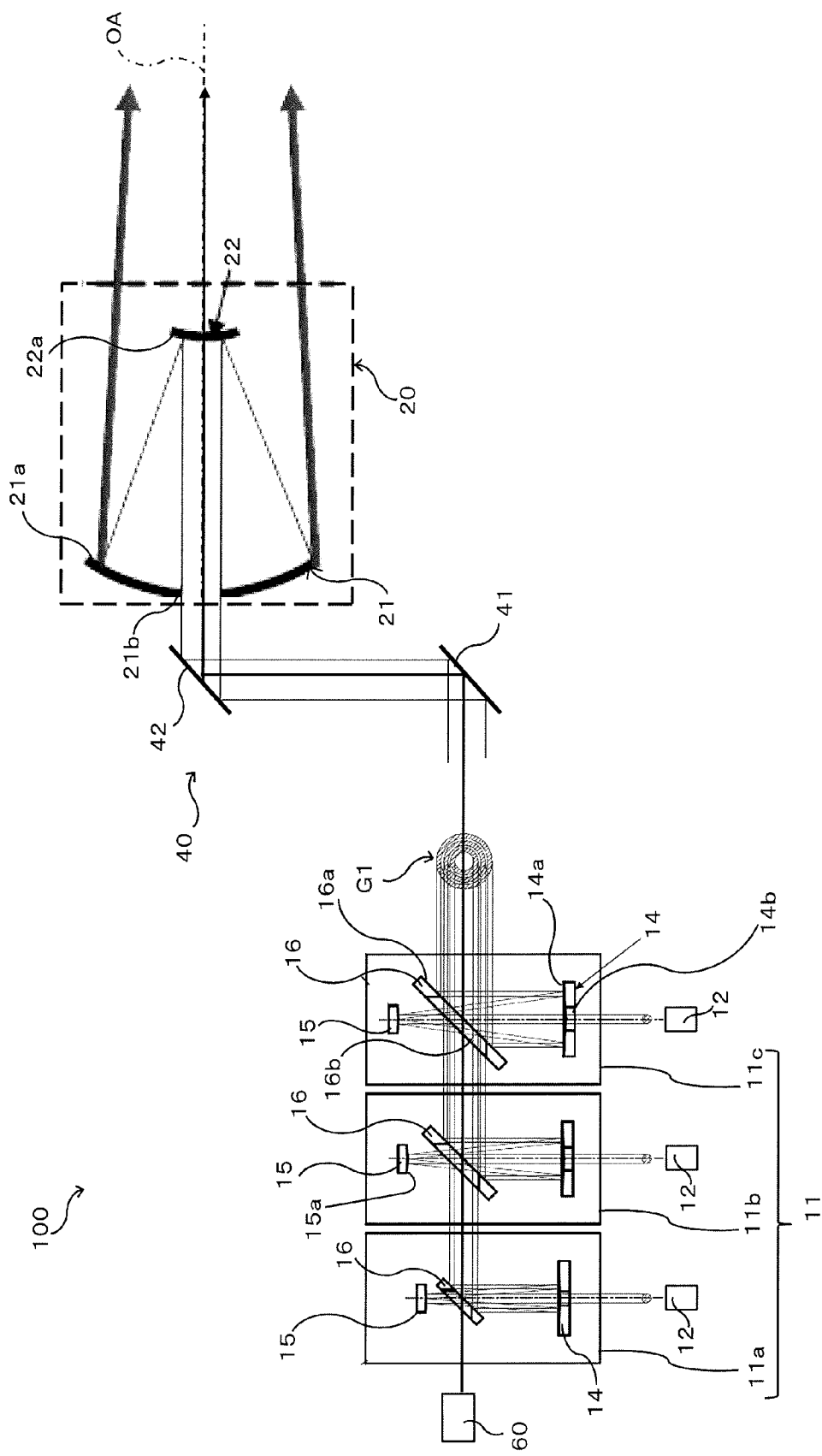
[Fig. 1]

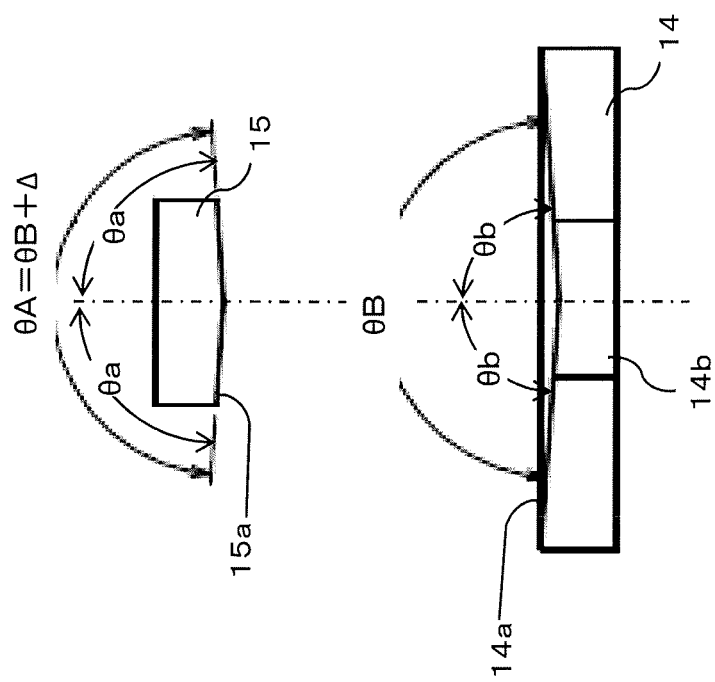
[Fig. 2]

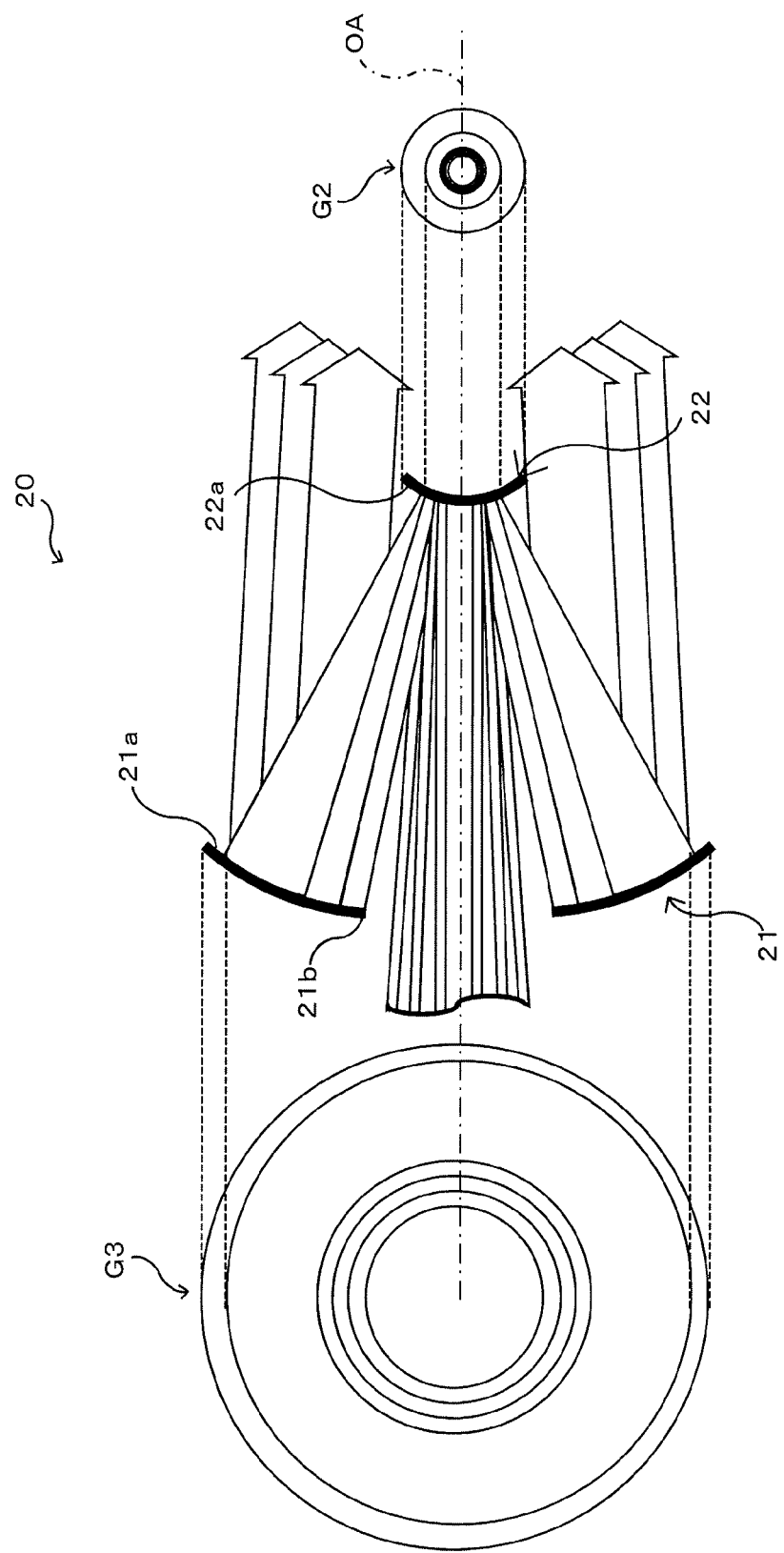
[Fig. 3]

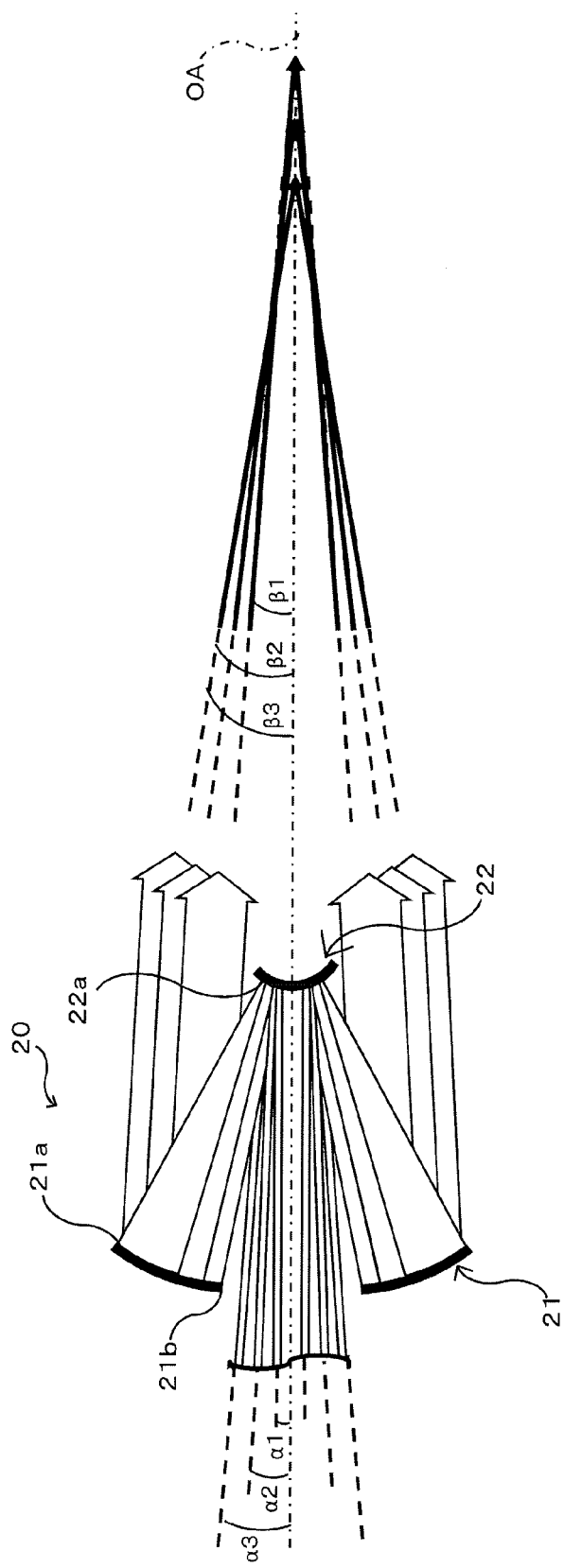
[Fig. 4]

Distance from center

Distance from center

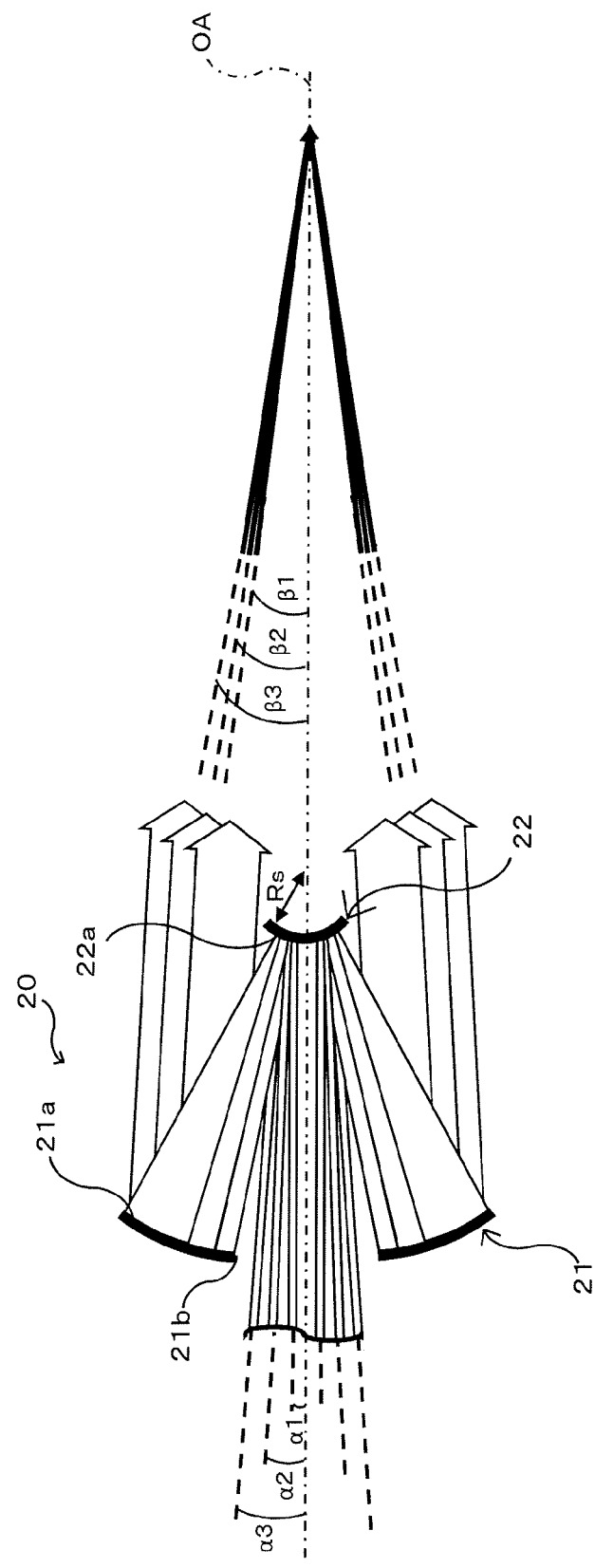
[Fig. 6]

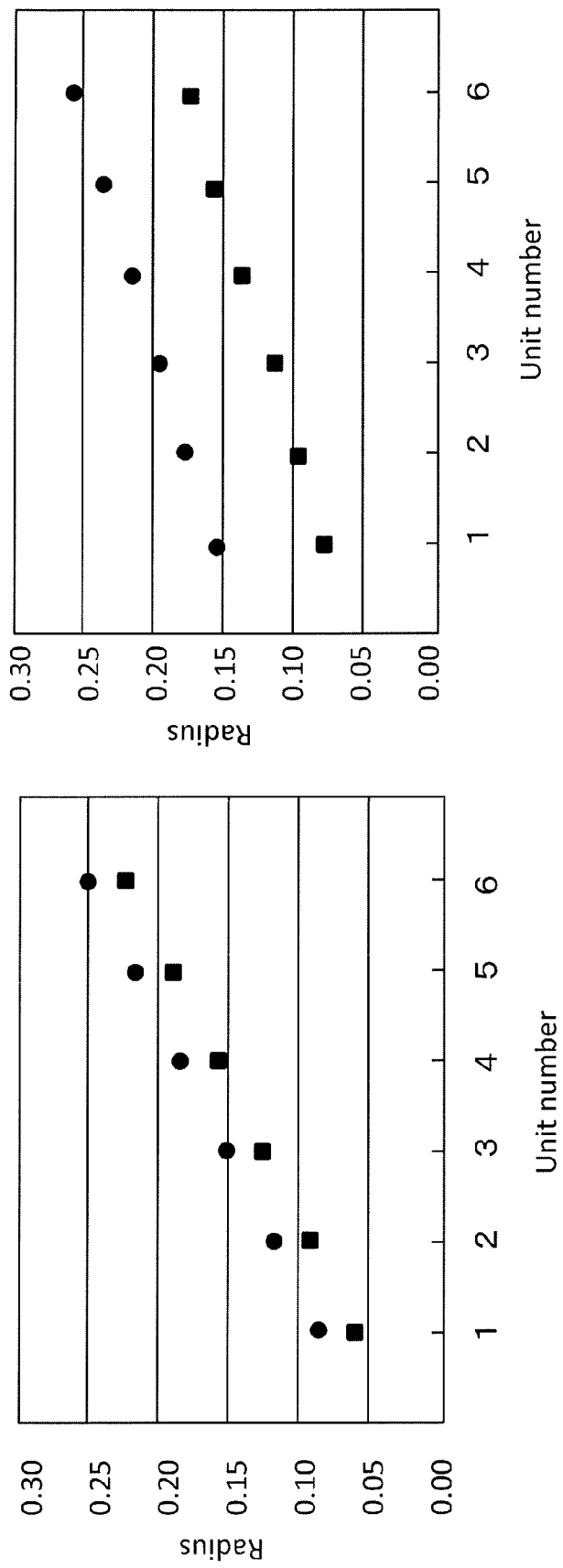

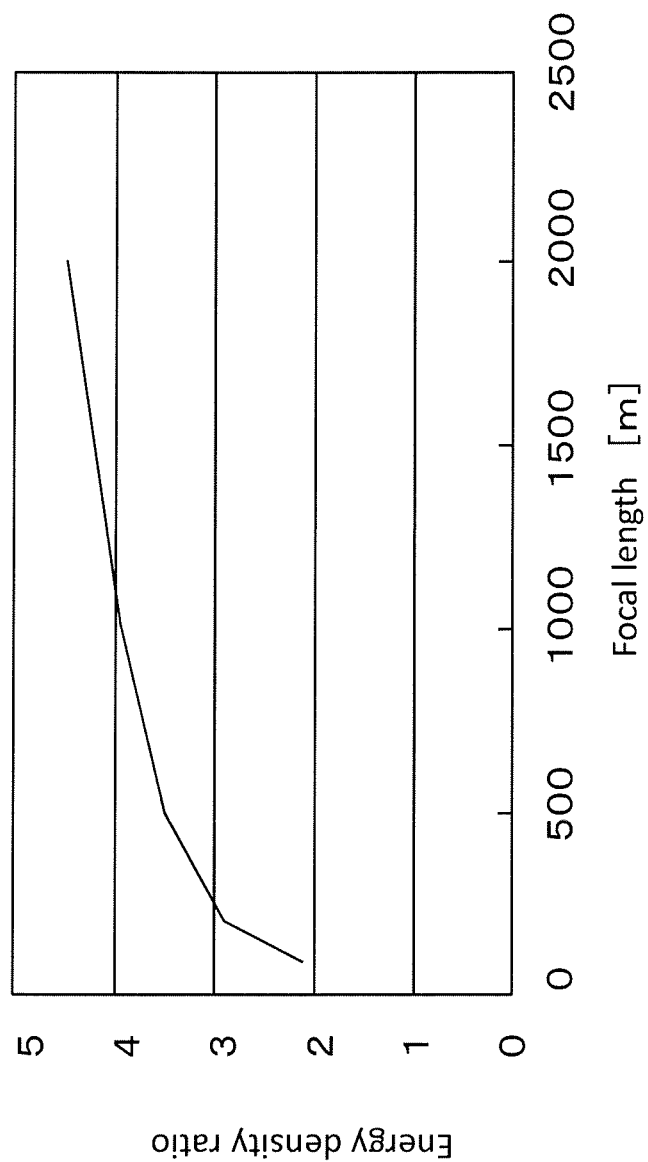
[Fig. 8]

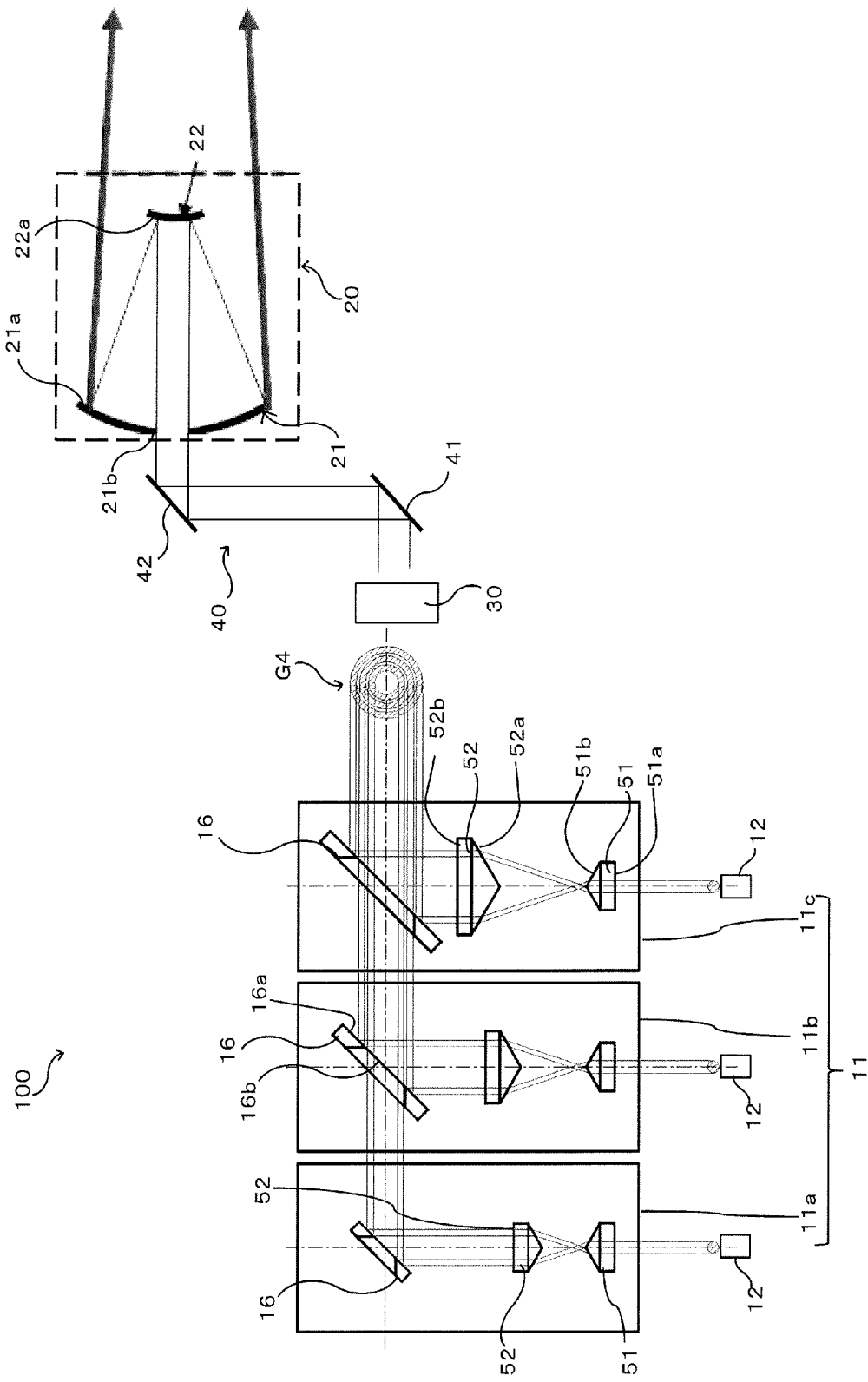

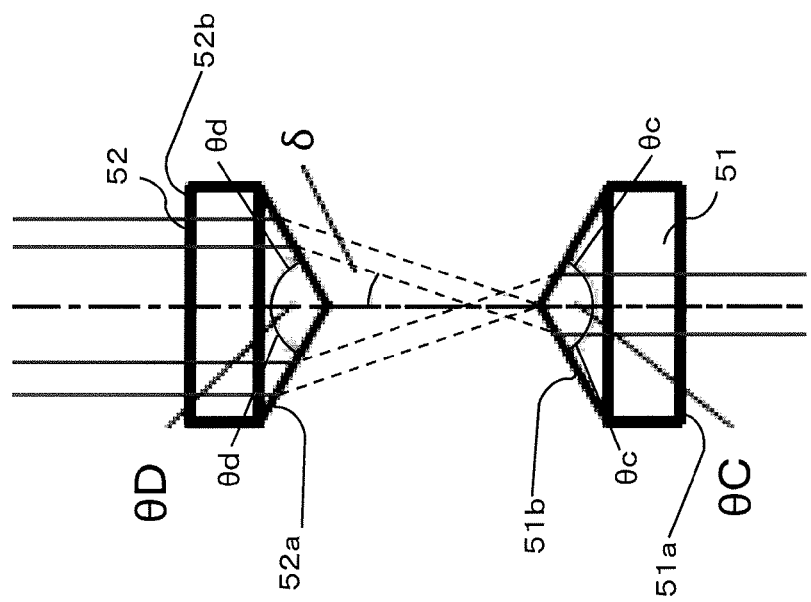
[Fig. 10]

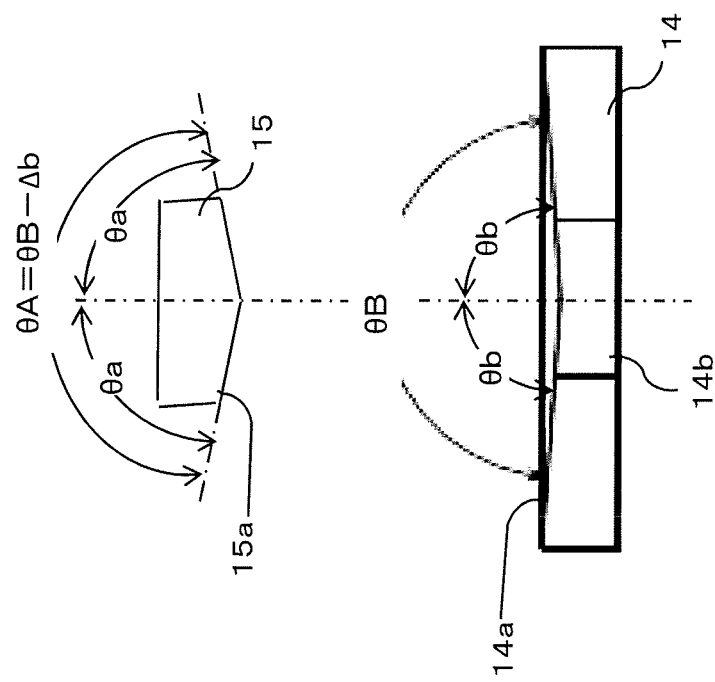
[Fig. 11]

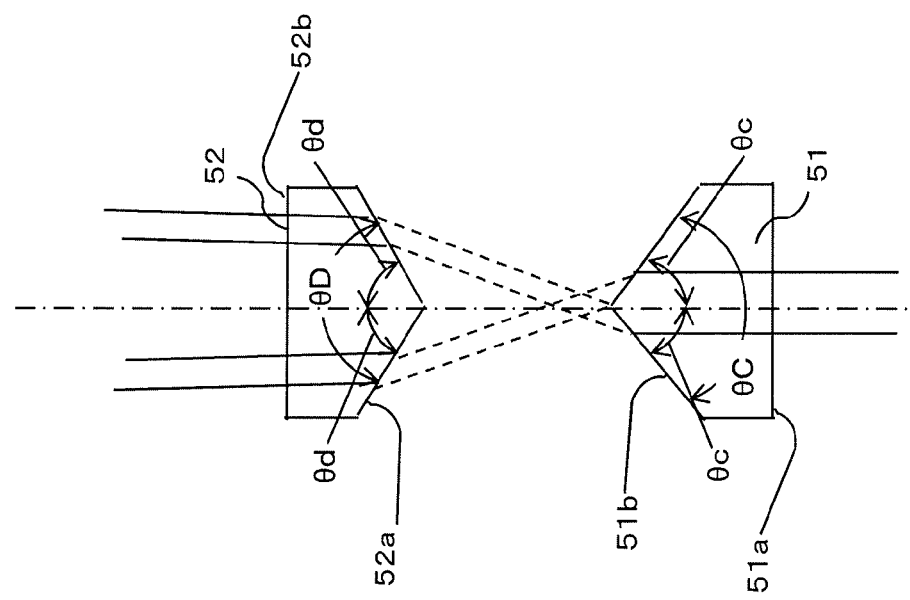
[Fig. 14]

LASER BEAM COMBINING DEVICE

TECHNICAL FIELD

The present invention relates to a laser beam combining device. In particular, the present invention relates to a laser beam combining device which incoherently combines a plurality of circular laser beams.

BACKGROUND ART

Conventionally, as a device intended to obtain a high output of a laser beam by combining a plurality of circular laser beams, for example, a laser beam combining device disclosed in Patent Literature 1 is known. This device combines the plurality of circular laser beams in such a manner that the circular laser beam with a larger diameter surrounds the circular laser beam with a smaller diameter.

CITATION LIST

Patent Literature

Patent Literature 1: Japanese Laid-Open Patent Application Publication No. Hei. 9-43537

SUMMARY OF INVENTION

Technical Problem

The condensing performance of the circular laser beams depends on the widths or inner/outer diameter ratios (inner diameters/outer diameters) of the ring-shaped cross-sections of the circular laser beams which are uncondensed (beams before being condensed). Regarding the circular laser beams with an equal outer diameter, the diameter of the condensed laser beam is larger and the condensing performance is lower, as the widths (cross-sectional areas of a flux of light) of the circular laser beams which are uncondensed are smaller. For example, in a case where the laser beam combined by the laser beam combining device disclosed in Patent Literature 1 is condensed, the condensed laser beam is low in the condensing performance. The reason is as follows. In the combined laser beam, the circular laser beam with a larger diameter surrounds the circular laser beam with a smaller diameter, and therefore, the width of each circular laser beam is small. For this reason, in a case where the laser beam obtained by combining the circular laser beams is condensed, the diameter of the condensed laser beam becomes larger. Thereby, the diameter of the laser beam obtained by combining the plurality of circular laser beams becomes larger, and its energy density (energy per unit area of a region to which the laser beam is emitted), or its power density (energy density per unit time) is reduced. As a result, high energy cannot be obtained at a focal point of the condensed laser beam, and a distance for which the condensed laser beam can be emitted is reduced.

The present invention has been developed to solve the above-described problem, and an object of the present invention is to provide a laser beam combining device which can realize high emission performances such as a high energy density or a high power density.

Solution to Problem

According to an aspect of the present invention, a laser beam combining device comprises: a plurality of shaping optical units which emit circular laser beams which are different from each other in a change amount of an outer diameter per unit travel distance, wherein the plurality of shaping optical units are placed in such a manner that the circular laser beams emitted from the shaping optical units have a concentric shape.

Advantageous Effects of Invention

The present invention has the above-described configuration, and has an advantage that it is possible to provide a laser beam combining device which can realize high emission performances such as a high energy density or a high power density.

The above and further objects, features and advantages of the present invention will more fully be apparent from the following detailed description of preferred embodiment with reference to accompanying drawings.

BRIEF DESCRIPTION OF DRAWINGS

FIG. 1 is a view schematically showing the configuration of a laser beam combining device according to Embodiment 1 of the present invention.

FIG. 2 is a view showing a relationship between conical angles of a pair of axicon mirrors of the laser beam combining device of FIG. 1.

FIG. 3 is a view showing the shape of circular laser beams in the beam condensing optical system of the laser beam combining device of FIG. 1.

FIG. 4 is a view schematically showing the combined laser beam condensed by the beam condensing optical system of FIG. 3.

FIG. 6 is a view schematically showing the configuration of a beam condensing optical system of a laser beam combining device according to Embodiment 2 of the present invention.

FIG. 7A is a graph showing the diameters of the circular laser beams on the fifth reflecting surface of FIG. 6, in a case where the circular laser beams do not overlap with each other on the fifth reflecting surface. FIG. 7B is a graph showing the diameters of the circular laser beams on the fifth reflecting surface of FIG. 6, in a case where the circular laser beams overlap with each other on the fifth reflecting surface.

FIG. 8 is a graph showing a relationship between a focal length and an energy density ratio in the laser beam combining device of FIG. 6.

FIG. 9 is a view schematically showing a laser beam combining device according to Embodiment 3 of the present invention.

FIG. 10 is a view showing a relationship between the conical angles of a pair of axicon lenses in the laser beam combining device of FIG. 9.

FIG. 11 is a view showing a relationship between the conical angles of a pair of axicon mirrors in a laser beam combining device according to Embodiment 4 of the present invention.

FIG. 14 is a view showing a relationship between the conical angles of the pair of axicon lenses in a laser beam combining device according to Embodiment 5 of the present invention.

DESCRIPTION OF EMBODIMENTS

Figure 5A:
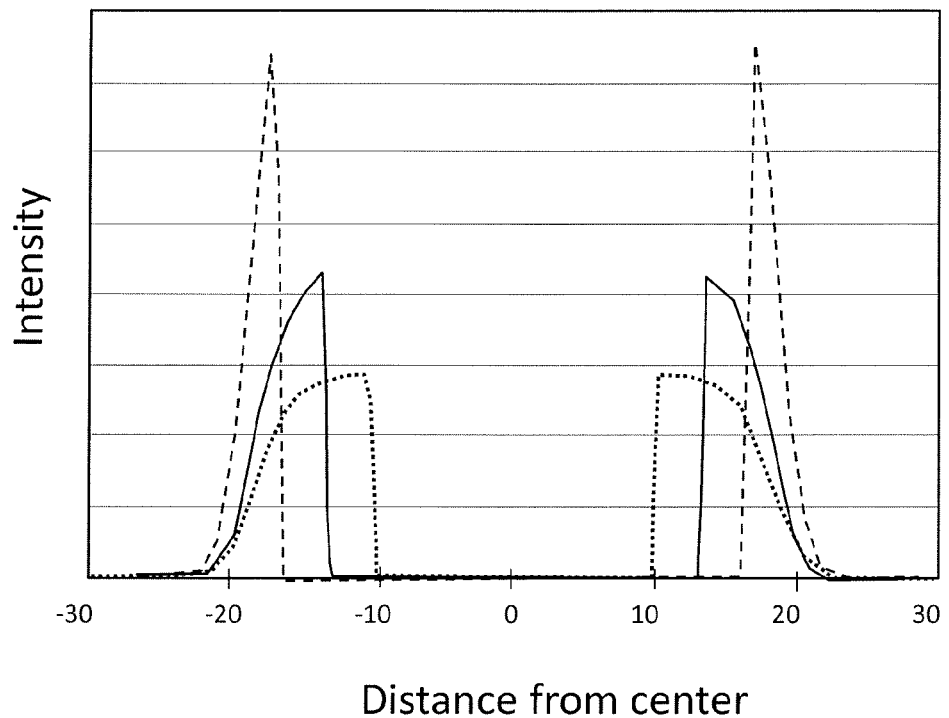
FIG. 5A is a graph showing the intensity distribution of the circular laser beams, on a fifth reflecting surface of FIG. 1.

According to a first aspect of the present invention, a laser beam combining device comprises a plurality of shaping optical units which emit circular laser beams which are different from each other in a change amount of an outer diameter per unit travel distance, wherein the plurality of shaping optical units are placed in such a manner that the circular laser beams emitted from the shaping optical units have a concentric shape.

According to a second aspect of the present invention, in the laser beam combining device according to the first aspect, each of the plurality of shaping optical units may include: a first axicon optical system having a conical surface which magnifies a diameter of a laser beam which enters the first axicon optical system and emits the circular laser beam; a second axicon optical system having a conical surface which reduces a diameter of the circular laser beam emitted from the first axicon optical system; and a catoptric system which changes a travel pathway of the circular laser beam emitted from the second axicon optical system, wherein at least one of a conical angle of the first axicon optical system and a conical angle of the second axicon optical system may be made different between the plurality of shaping optical units, and wherein the catoptric system of each of the plurality of shaping optical units emits the circular laser beam in such a manner that the circular laser beam which enters the catoptric system is concentric with the circular laser beam emitted from the catoptric system of another shaping optical unit included in the plurality of shaping optical units.

According to a third aspect of the present invention, in the laser beam combining device according to the second aspect, the first axicon optical system may be a convex axicon mirror having a reflecting surface protruding in a conical shape, the second axicon optical system may be a concave axicon mirror which has a reflecting surface which faces the reflecting surface of the convex axicon mirror and is concaved in a conical shape, and a hole penetrating the concave axicon mirror from the reflecting surface of the concave axicon mirror to a surface which is on an opposite side of the reflecting surface of the concave axicon mirror, and the catoptric system may be a scraper mirror which is placed between the convex axicon mirror and the concave axicon mirror, and has a reflecting surface which is inclined with respect to an optical axis of the circular laser beam emitted from the concave axicon mirror, and a hole penetrating the scraper mirror from the reflecting surface of the scraper mirror to a surface which is on an opposite side of the reflecting surface of the scraper mirror.

According to a fourth aspect of the present invention, in the laser beam combining device according to the third aspect, in each of the plurality of shaping optical units, a conical angle of the concave axicon mirror may be smaller than a conical angle of the convex axicon mirror, and a difference between the conical angle of the concave axicon mirror and the conical angle of the convex axicon mirror in each of the plurality of shaping optical units may be smaller than a difference between the conical angle of the concave axicon mirror and the conical angle of the convex axicon mirror in the shaping optical unit provided on an emission side of the scraper mirror of the each of the plurality of shaping optical units.

According to a fifth aspect of the present invention, in the laser beam combining device according to the third aspect, in each of the plurality of shaping optical units, a conical angle of the concave axicon mirror may be larger than a conical angle of the convex axicon mirror, and a difference between the conical angle of the concave axicon mirror and the conical angle of the convex axicon mirror in each of the plurality of shaping optical units may be larger than a difference between the conical angle of the concave axicon mirror and the conical angle of the convex axicon mirror in the shaping optical unit provided on an emission side of the scraper mirror of the each of the plurality of shaping optical units.

According to a sixth aspect of the present invention, in the laser beam combining device according to the second aspect, the first axicon optical system may be a first axicon lens having an emission surface protruding in a conical shape, the second axicon optical system may be a second axicon lens having an incident surface facing the emission surface of the first axicon lens and protruding in the conical shape, the catoptric system may be a scraper mirror which is placed in such a manner that the second axicon lens is interposed between the scraper mirror and the first axicon lens, and has a reflecting surface which is inclined with respect to an optical axis of the circular laser beam emitted from the second axicon lens, and a hole penetrating the scraper mirror from the reflecting surface of the scraper mirror to a surface which is on an opposite side of the reflecting surface of the scraper mirror.

According to a seventh aspect of the present invention, in the laser beam combining device according to the sixth aspect, a conical angle of the first axicon lens may be larger than a conical angle of the second axicon lens, and a difference between the conical angle of the first axicon lens and the conical angle of the second axicon lens in each of the plurality of shaping optical units may be smaller than a difference between the conical angle of the first axicon lens and the conical angle of the second axicon lens in the shaping optical unit provided on an emission side of the scraper mirror of the each of the plurality of shaping optical units.

According to an eighth aspect of the present invention, in the laser beam combining device according to the sixth aspect, a conical angle of the first axicon lens may be smaller than a conical angle of the second axicon lens, and a difference between the conical angle of the first axicon lens and the conical angle of the second axicon lens in each of the plurality of shaping optical units may be larger than a difference between the conical angle of the first axicon lens and the conical angle of the second axicon lens in the shaping optical unit provided on an emission side of the scraper mirror of the each of the plurality of shaping optical units.

According to a ninth aspect of the present invention, the laser beam combining device according to any one of the second to eighth aspects, may further comprise: a beam condensing optical system which condenses the circular laser beams emitted from the catoptric systems, and difference between the conical angle of the first axicon optical system and the conical angle of the second axicon optical system in each of the plurality of shaping optical units may be set so that the circular laser beams emitted from the catoptric systems of the plurality of shaping optical units overlap with each other on an emission surface of the beam condensing optical system.

According to a tenth aspect of the present invention, in the laser beam combining device according to the ninth aspect, the beam condensing optical system may include: an auxiliary mirror having a reflecting surface which magnifies diameters of the circular laser beams emitted from the catoptric systems, and a main mirror having a reflecting surface which condenses the circular laser beams emitted from the auxiliary mirror, and a difference between the conical angle of the first axicon optical system and the conical angle of the second axicon optical system in each of the plurality of shaping optical units may be set so that the circular laser beams emitted from the catoptric systems of the plurality of shaping optical systems overlap with each other on the reflecting surface of the main mirror.

According to an eleventh aspect of the present invention, the laser beam combining device according to the ninth or tenth aspect may further comprise: an image relay optical system which reduces diameters of the circular laser beams emitted from the catoptric systems and emits the circular laser beams to the beam condensing optical system.

According to a twelfth aspect of the present invention, in the laser beam combining device according to any one of the second to eleventh aspects, wave front curvature radiuses of the circular laser beams may be set to compensate a difference between focal lengths of the circular laser beams, the difference occurring due to a difference between the conical angle of the first axicon optical system and the conical angle of the second axicon optical system including manufacturing errors and geometric optical aberrations in each of the plurality of shaping optical units.

According to a thirteenth aspect of the present invention, the laser beam combining device according to any one of the second to twelfth aspects may further comprise: a guide light source which emits a visible light ray along an optical axis of the circular laser beams emitted from catoptric systems.

According to a fourteenth aspect of the present invention, in the laser beam combining device according to the first aspect, each of the plurality shaping optical units may include: an emission optical system which emits the circular laser beam; and a catoptric system having a surface of an elliptical cone shape which changes a diameter of the circular laser beam emitted from the emission optical system and changes a travel pathway of the circular laser beam, a conical angle on a major axis side of the surface of the elliptical cone shape of the catoptric system may be made different between the plurality shaping optical units, and a conical angle on a minor axis side of the surface of the elliptical cone shape of the catoptric system is made different between the plurality shaping optical units, and the catoptric system of each of the plurality of shaping optical units may emit the circular laser beam in such a manner that the circular laser beam which enters the catoptric system is concentric with the circular laser beam emitted from the catoptric system of another shaping optical unit included in the plurality of shaping optical units.

Hereinafter, the embodiments of the present invention will be specifically described with reference to the drawings. Throughout the drawings, the same or corresponding components are designated by the same reference symbols, and will not be described repeatedly.

(Embodiment 1)
(Configuration of Laser Beam Combining Device)

FIG. 1 is a view schematically showing the configuration of a laser beam combining device 100 according to Embodiment 1 of the present invention. FIG. 2 is a view showing a relationship between conical angles θA, θB of a pair of axicon mirrors 14, 15. With reference to FIGS. 1 and 2, the configuration of the laser beam combining device 100 will be described.

As shown in FIG. 1, the laser beam combining device 100 is configured to combine a plurality of circular laser beams, and includes a plurality of shaping optical units 11 (hereinafter, the shaping optical units will be referred to as a "unit"). Each of the circular laser beams is a ring-shaped laser beam formed by removing a center portion from the laser beam having a circular cross-section. The laser beam combining device 100 may further include laser light sources 12 and a beam condensing optical system 20. Each of the laser light sources 12 is a laser device which emits a solid laser beam. According to required characteristics, a semiconductor laser, a fiber laser, a solid-state laser, or the like is used as the laser light source 12. The laser light sources 12 are provided to correspond to the units 11, respectively. For example, three laser light sources 12 are provided. The three laser light sources 12 are placed in such a manner that the optical axes of the solid laser beams emitted from the three laser light sources 12 are parallel to each other.

The plurality of (e.g., three) units 11 are provided to emit the circular laser beams which are different from each other in reduction amount of the outer diameter per unit travel distance. The three units 11 include a first unit 11a, a second unit 11b, and a third unit 11c. The third unit 11c, the second unit 11b, and the first unit 11a are arranged in this order (according to an order in which the unit 11 is closer to the beam condensing optical system 20) in such a manner that the third unit 11c is closest to the beam condensing optical system 20. In some cases, each of the first unit 11a, the second unit 11b, and the third unit 11c will be expressed as an n-th unit 11, for the sake of convenience. In this case, the n-th unit 11 is closer to the beam condensing optical system 20 than a (n−1)-th unit 11 is. In the present embodiment, n and (n−1) are integers in a range of 1 to 3.

Each of the units 11 includes the pair of axicon mirrors 14, 15, and a scraper mirror 16. The pair of axicon mirrors 14, 15 include a concave axicon mirror 14 and a convex axicon mirror 15, respectively. The concave axicon mirror 14 is closer to the laser light source 12 than the convex axicon mirror 15 is.

The convex axicon mirror 15 is a first axicon optical system. The convex axicon mirror 15 has a substantially disc shape. The convex axicon mirror 15 includes a first reflecting surface 15a. The first reflecting surface 15a is a conical surface which magnifies (enlarges) the diameter (inner diameter and outer diameter) of an incident laser beam (laser beam which enters the first reflecting surface 15a), and emits (outputs) the circular laser beam. The first reflecting surface 15a protrudes in a conical shape, and the apex of this cone is located at the center of the convex axicon mirror 15. The convex axicon mirror 15 is placed in such a manner that the first reflecting surface 15a faces the laser light source 12.

The concave axicon mirror 14 is a second axicon optical system. The concave axicon mirror 14 has a substantially disc shape. The concave axicon mirror 14 includes a second reflecting surface 14a and a hole (first through-hole) 14b. The second reflecting surface 14a is a conical surface which reduces the diameter of the circular laser beam emitted from the convex axicon mirror 15. The second reflecting surface 14a is concaved in the conical shape, and the apex of this cone is located at the center of the concave axicon mirror 14. The diameter of the second reflecting surface 14a is larger than the diameter of the first reflecting surface 15a. The first through-hole 14b penetrates the concave axicon mirror 14 from the second reflecting surface 14a to a surface which is on an opposite side of the second reflecting surface 14a, along the axis of the second reflecting surface 14a, at the apex of the second reflecting surface 14a. The concave axicon mirror 14 is placed so that the first through-hole 14b extends along the optical axis of the solid laser beam emitted from the laser light source 12. The concave axicon mirror 14 is placed in such a manner that the second reflecting surface 14a faces the first reflecting surface 15a and the axis of the second reflecting surface 14a conforms to the axis of the first reflecting surface 15a.

The scraper mirror 16 is a catoptric system which changes the travel pathway of the circular laser beam emitted from the concave axicon mirror 14. The scraper mirror 16 is placed between the concave axicon mirror 14 and the convex axicon mirror 15. The scraper mirror 16 has a disc shape. The scraper mirror 16 has a flat third reflecting surface 16a, and a hole (second through-hole) 16b. The second through-hole 16b penetrates the scraper mirror 16 from the third reflecting surface 16a to a surface which is on an opposite side of the third reflecting surface 16a, at the center of the third reflecting surface 16a. The second through-hole 16b is opened in two directions which are inclined at 45 degrees with respect to the third reflecting surface 16a so that two laser beams which are orthogonal to each other can pass through the second through-hole 16b. The scraper mirror 16 is placed in such a manner that a first direction of the two directions is parallel to the axis of the second reflecting surface 14a, and a second direction of the two directions is orthogonal to the axis of the second reflecting surface 14a. Also, the scraper mirror 16 is placed in such a manner that the center of the second through-hole 16b on the second reflecting surface 14a is located on the axis of the first reflecting surface 15a and the axis of the second reflecting surface 14a, and the third reflecting surface 16a is inclined at 45 degrees with respect to the axis of the second reflecting surface 14a.

In each of the units 11, the pair of axicon mirrors 14, 15 are configured in such a manner that the conical angle θA of the first reflecting surface 15a and the conical angle θB of the second reflecting surface 14a are different from each other and a difference Δ between the conical angle θA and the conical angle θB is larger as the corresponding unit 11 is closer to the beam condensing optical system 20 (according to the order in which the unit 11 is closer to the beam condensing optical system 20). Specifically, as shown in FIG. 2, the conical angle θA of the first reflecting surface 15a is twice as great as an angle θa formed between the rotational axis of the cone of the first reflecting surface 15a and the generating line of the cone, in the first reflecting surface 15a. The conical angle θB of the second reflecting surface 14a is twice as great as an angle θb formed between the rotational axis of the cone of the second reflecting surface 14a and the generating line of the cone, in the second reflecting surface 14a. The conical angle θA and the conical angle θB are obtuse angles, respectively, and are preferably, 170 to 180 degrees. The conical angle θA of the first reflecting surface 15a is set to be larger than the conical angle θB of the second reflecting surface 14a. This difference Δ between the conical angle θA of the first reflecting surface 15a and the conical angle θB of the second reflecting surface 14a is, for example, 0.001 to 0.1 degrees. The difference Δ is larger, according to the order in which the unit 11 is closer to the beam condensing optical system 20. In other words, the difference Δ of the (n−1)-th unit 11 is set to be smaller than the difference Δ of the n-th unit 11 placed on the emission side of the third reflecting surface 16a. For example, the difference Δ of the first unit 11a is set to 0.010, the difference Δ of the second unit 11b is set to 0.015, and the difference Δ of the third unit 11c is set to 0.020. In the present embodiment, the conical angle θB is constant, while the conical angle θA is larger according to the order in which the unit 11 is closer to the beam condensing optical system 20. Alternatively, the conical angle θA may be constant and the conical angle θB may be varied, or both of the conical angle θA and the conical angle θB may be varied, so long as the difference Δ is larger according to the order in which the unit 11 is closer to the beam condensing optical system 20. Although in the present embodiment, the conical angle θA is larger than the conical angle θB in each of the units 11, the conical angle θA may be equal to the conical angle θB in the first unit 11a. In this case, the difference Δ between the conical angle θA and the conical angle θB is zero.

As shown in FIG. 1, in the units 11, the pair of axicon mirrors 14, 15 are placed in such a manner that a distance between the first reflecting surface 15a and the second reflecting surface 14a is larger according to the order in which the unit 11 is closer to the beam condensing optical system 20. In this configuration, the diameter of the circular laser beam reflected by the reflecting surfaces 14a, 15a is larger according to the order in which the unit 11 is closer to the beam condensing optical system 20. Instead of adjusting the distance between the first reflecting surface 15a and the second reflecting surface 14a, the conical angle θA of the first reflecting surface 15a and the conical angle θB of the second reflecting surface 14a may be adjusted so that the diameter of the circular laser beam reflected by the reflecting surfaces 14a, 15a is larger according to the order in which the unit 11 is closer to the beam condensing optical system 20.

In the units 11, the scraper mirrors 16 are arranged in such a manner that the center lines (guide lines) of the second through-holes 16b in the second direction 16b conform to each other. In the units 11, the scraper mirrors 16 are configured in such a manner that the diameter of the third reflecting surface 16a and the diameter of the second through-hole 16b, which correspond to the unit 11 which is closer to the beam condensing optical system 20, are larger. In other words, the diameter of the scraper mirror 16 and the diameter of the second through-hole 16b of the n-th unit 11 are larger than those of the (n−1)-th unit 11.

The beam condensing optical system 20 is the catoptric system including a main mirror 21 and an auxiliary mirror 22. The main mirror 21 includes a fifth reflecting surface 21a and a hole (third through-hole 21b). The auxiliary mirror 22 includes a fourth reflecting surface 22a. The third through-hole 21b penetrates the main mirror 21 from the fifth reflecting surface 21a to a surface which is on an opposite side of the fifth reflecting surface 21a, at the center of the fifth reflecting surface 21a. The diameter of the fifth reflecting surface 21a is set to be larger than that of the fourth reflecting surface 22a. The fifth reflecting surface 21a is a concave surface, while the fourth reflecting surface 22a is a convex surface. Alternatively, the fourth reflecting surface 22a may be a concave surface.

The reflecting surfaces 21a, 22a, are formed by non-spherical surfaces, respectively, such as paraboloidal surfaces or hyperboloidal surfaces. In the present embodiment, the reflecting surfaces 21a, 22a are formed by the paraboloidal surfaces. Alternatively, the fifth reflecting surface 21a and/or the fourth reflecting surface 22a may be formed by spherical surfaces, respectively. The curvature radius of the fourth reflecting surface 22a is set to be much larger than the radius of the outer diameter of the circular laser beam which enters the fourth reflecting surface 22a to suppress occurrence of a geometric optical aberration. The auxiliary mirror 22 is placed in such a manner that the axis of the fourth reflecting surface 22a conforms to the axis of the fifth reflecting surface 21a and the fourth reflecting surface 22a faces the fifth reflecting surface 21a.

Although the beam condensing optical system 20 is an optical system of a Cassegrain type, including the main mirror 21 having the third through-hole 21b, the beam condensing optical system 20 is not limited to this. For example, the beam condensing optical system 20 may be a Nasmyth type or a Coude type. In this case, the main mirror 21 is not formed with the third through-hole 21b and a reflecting surface is placed between the main mirror 21 and the auxiliary mirror 22. This reflecting surface is a flat surface, and is inclined with respect to the axis of the auxiliary mirror 22. The reflecting surface reflects the circular laser beam which enters the reflecting surface from the side, and guides the reflected laser beam to the auxiliary mirror 22.

The laser beam combining device 100 may include a reduction optical system 30 (see FIG. 9) or a light guiding optical system 40 between the units 11 and the beam condensing optical system 20, as necessary. The reduction optical system 30 (see FIG. 9) is an optical system which reduces the diameters of the circular laser beams emitted from the units 11, respectively. The light guiding optical system 40 is an optical system which guides the circular laser beams emitted from the unit 11 to the beam condensing optical system 20. In the present embodiment, the light guiding optical system 40 includes two flat mirrors 41, 42.

The laser beam combining device 100 may further include a guide light source 60 which emits visible light ray. The guide light source 60 is placed so that the visible light ray passes through the centers of the second through-holes 16b of the scraper mirrors 16 along the guide line from the second direction.

(Operation of Laser Beam Combining Device)

FIG. 3 is a view showing the shape of a combined laser beam in the beam condensing optical system 20. FIG. 4 is a view schematically showing the combined laser beam condensed by the beam condensing optical system 20. Now, with reference to FIGS. 1 to 4, the operation for combining the plurality of circular laser beams, which is performed by the laser beam combining device 100, will be described.

As shown in FIG. 1, the solid laser beams emitted from the laser light sources 12 enter the units 11, respectively. In each of the units 11, the diameter of the first through-hole 14b of the concave axicon mirror 14 and the diameter of the second through-hole 16b of the scraper mirror 16 are set to be larger than that of the solid laser beam. In this structure, the solid laser beam passes through the first through-hole 14b, and then through the second through-hole 16b in the first direction. After that, the solid laser beam reaches the first reflecting surface 15a of the convex axicon mirror 15. At this time, the apex of the first reflecting surface 15a is located on the optical axis of the solid laser beam. For this reason, the center of the solid laser beam contacts the apex of the first reflecting surface 15a. The solid laser beam is line-symmetric with respect to the axis of the first reflecting surface 15a having the conical shape and is reflected on the first reflecting surface 15a at a constant angle irrespective of a distance from this axis. Thereby, the solid laser beam is converted into the circular laser beam. The circular laser beam travels toward the scraper mirror 16 while keeping its width constant. The diameter of the second through-hole 16b of the scraper mirror 16 is set to be larger than the outer diameter of the circular laser beam reflected on the first reflecting surface 15a. Therefore, the circular laser beam travels through the second through-hole 16b in the first direction and toward the concave axicon mirror 14. At this time, the circular laser beam travels along the axis of the second reflecting surface 14a while expanding around the optical axis, and the inner diameter of the circular laser beam becomes larger than the diameter of the first through-hole 14b of the concave axicon mirror 14. Therefore, the circular laser beam contacts the second reflecting surface 14a around the first through-hole 14b. The circular laser beam is line-symmetric with respect to the axis of the second reflecting surface 14a and is reflected on the second reflecting surface 14a at a constant angle irrespective of a distance from this axis. Since the axis of the second reflecting surface 14a conforms to the axis of the first reflecting surface 15a, the circular laser beam is reflected on the second reflecting surface 14a while keeping the ring-shape. When the conical angle θB of the second reflecting surface 14a is slightly smaller than the conical angle θA of the first reflecting surface 15a, the circular laser beam reflected on the second reflecting surface 14a travels again toward the scraper mirror 16 while becoming slightly narrower around the optical axis. However, since the second reflecting surface 14a is the conical surface, the circular laser beam keeps its width constant. The inner diameter of the circular laser beam is larger than the diameter of the second through-hole 16b of the scraper mirror 16. Therefore, the circular laser beam contacts the third reflecting surface 16a around the second through-hole 16b. Then, the circular laser beam is reflected in a direction perpendicular to the axis of the second reflecting surface 14a, and is emitted from the unit 11.

The diameters of the circular laser beams are adjusted so that the diameter of the circular laser beam is larger according to the order in which the unit 11 is closer to the beam condensing optical system 20 (the diameter of the circular laser beam, corresponding to the unit 11 located to be closer to the beam condensing optical system 20, is larger). In this adjustment, the diameter of the circular laser beam (n-th circular laser beam) emitted from the n-th unit 11 is larger than that of the circular laser beam ((n−1)-th circular laser beam) emitted from the (n−1)-th unit 11.

In contrast, in the units 11, the diameter of the second through-hole 16b of the scraper mirror 16 is larger according to the order in which the unit 11 is closer to the beam condensing optical system 20. In particular, the diameter of the second through-hole 16b of the n-th unit 11 is larger than the outer diameter of the (n−1)-th circular laser beam emitted from the (n−1)-th unit 11. Therefore, the (n−1)-th circular laser beam can travel through the second through-hole 16b of the n-th unit 11.

In the units 11, the centers of the third reflecting surfaces 16a are aligned on the guide line and the inclination angles of the third reflecting surfaces 16a are equal. Therefore, the optical axes of the circular laser beams reflected on the third reflecting surfaces 16a of the units 11 conform to each other.

As can be seen from the cross-sectional shape of the combined laser beam indicated by G1 of FIG. 1, the three circular laser beams are combined concentrically, and the combined laser beam is emitted coaxially. This combined laser beam has a shape in which the n-th circular laser beam surrounds the (n−1)-th circular laser beam, at a time point just after the combined laser beam has been emitted.

Then, the reduction optical system 30 (see FIG. 9) reduces the size of the combined laser beam so that the combined laser beam can travel through the third through-hole 21b of the beam condensing optical system 20. After having traveled through the reduction optical system 30 (see FIG. 9), the combined laser beam is reflected on the flat plate mirrors 41, 42 of the light guiding optical system 40 and then is guided to the beam condensing optical system 20. In the beam condensing optical system 20, the combined laser beam travels through the third through-hole 21b of the main mirror 21 and toward the auxiliary mirror 22.

At this time, the diameter of each of the circular laser beams of the combined laser beam is reduced, while maintaining a state in which a difference (width) between the outer diameter and inner diameter of the ring-shaped cross-section of the circular laser beam is constant. The reason is as follows. As shown in FIG. 2, since the conical angle θA is larger than the conical angle θB, the circular laser beam travels to be close to the optical axis OA rather than parallel to the optical axis OA.

The conical angle θA is larger according to the order in which the unit 11 is closer to the beam condensing optical system 20 so that the difference Δ between the conical angle θA and the conical angle θB is larger according to the order in which the unit 11 is closer to the beam condensing optical system 20. Thereby, the incident angle and reflection angle of the circular laser beam reflected on the first reflecting surface 15a, the second reflecting surface 14a, and the third reflecting surface 16a, are smaller, according to the order in which the unit 11 is closer to the beam condensing optical system 20. For this reason, as shown in FIG. 3, the angle (inclination) formed between the optical axis OA and the circular laser beam reflected on the third reflecting surface 16a is larger, according to the order in which the unit 11 is closer to the beam condensing optical system 20. Therefore, the rate with which the diameter of the circular laser beam is reduced as it is more distant from the third reflecting surface 16, is set to be larger, according to the order in which the unit 11 is closer to the beam condensing optical system 20.

At a time point when the circular laser beam is reflected on the third reflecting surface 16a, the diameter of the circular laser beam is larger, according to the order in which the unit 11 is closer to the beam condensing optical system 20. Because of this, the inclination of the circular laser beam with a larger diameter is larger, and the reduction rate of the diameter the circular laser beam with a larger diameter is larger. Therefore, the diameter of the n-th circular laser beam becomes much smaller than that of the (n−1)-th circular laser beam as the circular laser beam becomes more distant from the third reflecting surface 16a, while keeping the width constant. Then, on the fourth reflecting surface 22a, the inner diameter of the n-th circular laser beam becomes smaller than the outer diameter of the (n−1)-th circular laser beam, so that the n-th circular laser beam overlaps with the (n−1)-th circular laser beam. As a result, as indicated by G2 of FIG. 3, the circular laser beams of the combined laser beam on the fourth reflecting surface 22a overlap with each other.

Then, the combined laser beam is reflected on the fourth reflecting surface 22a of the convex shape, and magnified (enlarged). Thereby, the circular laser beams travel toward the main mirror 21 while increasing the diameters and widths of the ring-shaped cross-sections as they become more distant from the fourth reflecting surface 22a. Therefore, as indicated by G3 of FIG. 3, the circular laser beams of the combined laser beam on the fifth reflecting surface 21a of the main mirror 21 overlap with each other.

The combined laser beam is reflected on the fifth reflecting surface 21a of a concave shape and is condensed. Thereby, as shown in FIG. 4, the circular laser beams converge while reducing the diameters of the ring-shaped cross-sections as the circular laser beams become more distant from the fifth reflecting surface 21a. At this time, since the focal lengths of the circular laser beams of the combined laser beam are different from each other, the combined laser beam is emitted while having a width in the direction of the optical axis OA.

Specifically, the curvature radius of the fifth reflecting surface 21a/the curvature radius of the fourth reflecting surface 22a is a magnification rate (percentage) P, and a distance F from the fifth reflecting surface 21a to the focal point is set. Also, the angle of the n-th circular laser beam which enters the fourth reflecting surface 22a is indicated by αn, and the radius (in the present embodiment, an average value of the outer diameter and the inner diameter) of the n-th circular laser beam which enters the fifth reflecting surface 21a is indicated by yn. In this case, an angle (inclination) βn formed between the optical axis OA and the n-th circular laser beam emitted from the fifth reflecting surface 21a is represented by $\beta n = \tan^{-1}(yn/F) + \alpha n/P$. From this, the focal length Fn of the n-th circular laser beam is represented by $Fn = yn/\tan\{\tan^{-1}(yn/F) + \alpha n/P\}$. Since the difference Δ between the conical angle θA and the conical angle θB is larger according to the order in which the unit 11 is closer to the beam condensing optical system 20, the incident angle αn is larger according to the order in which the unit 11 is closer to the beam condensing optical system 20. Thereby, the distance Fn from the n-th circular laser beam to the focal point, is shorter, according to the order in which the unit 11 is closer to the beam condensing optical system 20. As a result, the combined laser beam is emitted from the laser beam combining device 100 at an energy density which is high over a wide range in the optical axis OA.

To realize the high output of the combined laser beam, the laser light sources 12 which emit the laser beams of infrared wavelengths are commonly used. In this case, the laser beam combined by the laser beam combining device 100 and emitted therefrom cannot be seen by naked eyes. In contrast, the visible light ray emitted from the guide light source 60 travels along the optical axis of the optical axis OA of the circular laser beams and the optical axis of the combined laser beam. Therefore, based on this visible light ray, the position of the combined laser beam can be confirmed.

(Functions and Advantages)

In the above-described embodiment, the reflecting surfaces 14a, 15a of each of the units 11 are the conical surfaces, and the difference Δ between the conical angles θA, θB of the reflecting surfaces 14a, 15a is larger, according to the order in which the unit 11 is closer to the beam condensing optical system 20. In this configuration, the circular laser beam emitted from each of the units 11 reduces its outer diameter as it travels, and the amount of reduction of the outer diameter, per unit travel distance is larger according to the order in which the unit 11 is closer to the beam condensing optical system 20. In the circular laser beams, the ratio of the outer diameter with respect to the inner diameter (inner/outer diameter ratio) increases while keeping its width constant. Thereby, the plurality of circular laser beams can easily overlap with each other on the main mirror 21 before they are condensed, and the widths and inner/outer diameter ratios of the circular laser beams can be increased without increasing the size of the main mirror 21. When the circular laser beams are condensed in such a manner that the widths and outer diameters of the circular laser beams are reduced, the diameter of the condensed laser beam can be reduced. As a result, the energy density of the combined laser beam in the emission position can be increased without increasing the size of the laser beam combining device 100.

Figure 5B:
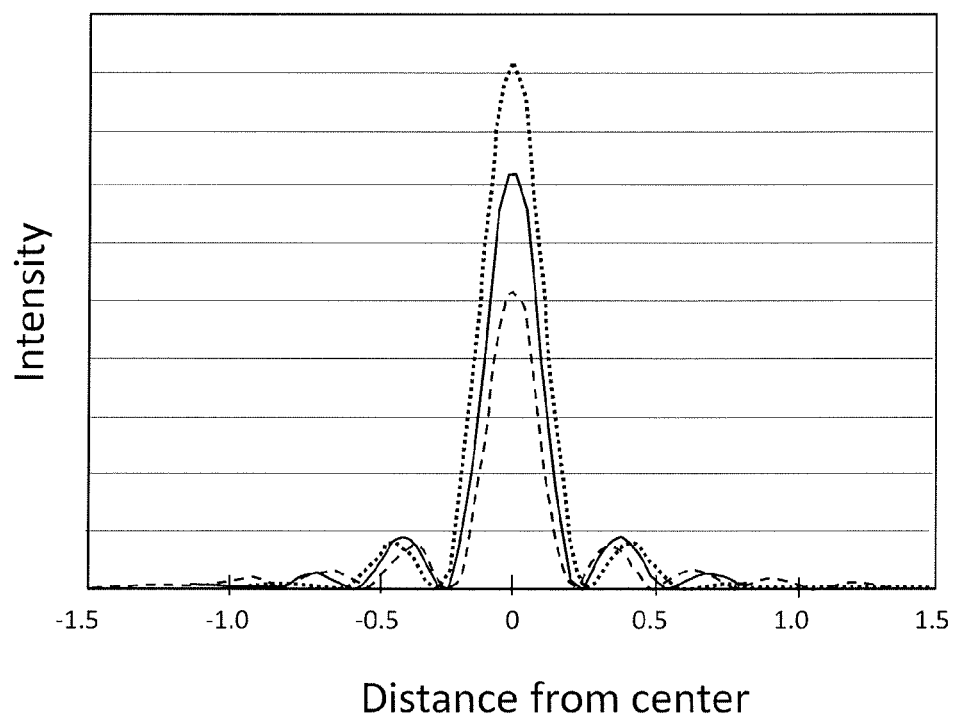
FIG. 5B is a graph showing the intensity distribution of a laser beam obtained by condensing the circular laser beams of FIG. 5A.

FIG. 5A is a graph showing the intensity distribution (near-field image) of the circular laser beams which are uncondensed (beams before being condensed), on the fifth reflecting surface 21a. In this graph, a broken line indicates the intensity (power density) of the circular laser beam with the inner/outer diameter ratio M=1.2, a solid line indicates the intensity of the circular laser beam with the inner/outer diameter ratio M=1.5, and a dotted line indicates the intensity of the circular laser beam with the inner/outer diameter ratio M=2.0. The values of the outer diameters of the circular laser beams at the fifth reflecting surface 21a are made equal to each other, and the values of the total powers (intensity integral values) of the circular laser beams at the fifth reflecting surface 21a are made equal to each other. The wavelength of the circular laser beam emitted from each of the light sources 12 is 1.315 μm, the outer diameter of the circular laser beam on the fifth reflecting surface 21a is 40 cm, and a distance from the fifth reflecting surface 21a to a target position is 1000 m. FIG. 5B is a graph showing the intensity distribution (far-field image) of the laser beam obtained by condensing the circular laser beams of FIG. 5A. Specifically, a broken line indicates the intensity of the laser beam obtained by condensing the circular laser beam with the inner/outer diameter ratio M=1.2, a solid line indicates the intensity of the laser beam obtained by condensing the circular laser beam with the inner/outer diameter ratio M=1.5, and a dotted line indicates the intensity of the laser beam obtained by condensing the circular laser beam with the inner/outer diameter ratio M=2.0. In each graph, a vertical axis indicates the intensity of the laser beam, while a horizontal axis indicates a distance from the center of the laser beam.

As shown in FIG. 5B, the intensity (power density) of the condensed laser beam in the far-field image is higher as the inner/outer diameter ratio of the circular laser beam which is uncondensed is larger. Specifically, as shown in FIG. 5A, as the inner/outer diameter ratio of each circular laser beam which is uncondensed is smaller, the width of the circular laser beam is smaller, and the intensity of the circular laser beam is higher. As shown in FIG. 5B, after the circular laser beams are condensed, side lobes emerge around a main lobe with a highest intensity, in each laser beam. As the inner/outer diameter ratio of the circular laser beam which is uncondensed, is lower, the intensities of the side lobes of the condensed laser beam become higher. Thereby, the intensity of the condensed laser beam is deconcentrated, and its condensing performance is reduced. As should be understood from this, as the inner/outer diameter ratio and width of the circular laser beam which is uncondensed, are larger, the intensity of the condensed laser beam becomes higher. As a result, by overlapping the circular laser beams with each other on the fifth reflecting surface 21a and increasing their widths, the diameter of the condensed laser beam can be reduced and the power density and the energy density which is time integration of the power density at the target position, can be increased.

The difference Δ between the conical angles θA, θB is made different according to the order in which the unit 11 is closer to the beam condensing optical system 20, and the incident angle αn of each circular laser beam is preset appropriately. In this way, a difference between the focal lengths of the laser beams obtained by condensing the circular laser beams is set. Because of the difference, the emission range of the laser beam with a relatively high energy density is expanded on the optical axis OA. This allows the laser beam to be emitted to the target position, even in a case where it is difficult to measure a distance to the target position.

By combining the plurality of circular laser beams, the energy of the combined laser beam can be increased, and the high output of the combined laser beam can be realized.

Since the circular laser beams are combined coaxially, they are condensed on the optical axis OA of the combined laser beam. Therefore, the expansion of the emission range, in a direction perpendicular to the optical axis OA, does not take place. As a result, the energy density of the combined laser beam on the optical axis OA can be maintained at a high level.

The catoptric system including the pair of axicon mirrors 14, 15, and the scraper mirror 16 is used as the unit 11. In this configuration, the plurality of circular laser beams can be combined, and the energy of the combined laser beam can be increased. Further, it becomes possible to eliminate problems such as a thermal lens effect or an output loss, which may take place in a case where a transmission optical system is used as the unit 11. As a result, reduction of the energy of the circular laser beams can be prevented, and the energy density of the combined laser beam at the focal point can be maintained at a high level.

Moreover, since the visible light ray is emitted from the guide light source 60 along the optical axes of the circular laser beams and located on the center of the combined laser beam, the emission position of the combined laser beam can be seen by naked eyes, based on this visible light ray.

(Embodiment 2)

In the laser beam combining device 100 according to the above described Embodiment 1, the curvature radius of the auxiliary mirror 22 is set to be much larger than the radius of the outer diameter of the circular laser beam which enters the auxiliary mirror 22, to suppress occurrence of the geometric optical aberration. In this configuration, the laser beam combining device 100 may be used in cases where the laser beam is emitted at a relatively high energy density in a wide range on the optical axis OA. However, in some cases, a laser beam with a higher energy density is required. To this end, in the laser beam combining device 100 according to Embodiment 2, the curvature radius of the auxiliary mirror 22 is set so that the focal positions of the laser beams of the combined laser beam become close to each other. FIG. 6 is a view schematically showing the beam condensing optical system 20 of the laser beam combining device 100 according to Embodiment 2. Now, with reference to FIG. 6, the configuration of the laser beam combining device 100 will be described.

As shown in FIG. 6, the fifth reflecting surface 21a of the main mirror 21 and the fourth reflecting surface 22a of the auxiliary mirror 22 are formed by paraboloidal surfaces, respectively. The circular laser beams are reflected on the fifth reflecting surface 21a and the fourth reflecting surface 22a which are configured as described above, and thus the geometric optical aberration occurs. As a result, the focal positions of the circular laser beams can be made close to each other.

Specifically, the curvature radius of the fifth reflecting surface 21a/the curvature radius of the fourth reflecting surface 22a is a magnification rate (percentage) P, and a distance F from the fifth reflecting surface 21a to the focal point is set based on a distance between the fifth reflecting surface 21a and the fourth reflecting surface 22a. Also, the incident angle of the n-th circular laser beam, with respect to the fourth reflecting surface 22a, is indicated by $\alpha n$, and the radius (in the present embodiment, an average value of the outer diameter radius and the inner diameter radius) of the n-th circular laser beam which enters the fifth reflecting surface 21a is indicated by $yn$. The geometric optical aberration with respect to the n-th circular laser beam is indicated by $\gamma n$. In this case, an inclination $\beta n$ formed between the optical axis OA and the n-th circular laser beam emitted from the fifth reflecting surface 21a is represented by $\beta n = \tan^{-1}(yn/F) + \alpha n/P - \gamma n$. From this, the focal length Fn of the n-th circular laser beam is represented by $Fn = yn/\tan\{\tan^{-1}(yn/F) + \alpha n/P - \gamma n\}$. Each incident angle $\alpha n$ and/or each geometric optical aberration $\gamma n$ is/are set so that $\alpha n/P - \gamma n$ is cancelled. This results in $\alpha n/P - \gamma n = 0$, and Fn=F. The focal length becomes equal for every n.

If a difference occurs in the incidence angle $\alpha n$ of the circular laser beam of the combined laser beam, with respect to the fourth reflecting surface 22a, the inclination $\beta n$ of the circular laser beam is different, so that the focal length of the condensed laser beam is different. In contrast by cancelling the difference in the incidence angle $\alpha n$ by use of the geometric optical aberration $\gamma n$, the different in the inclination $\beta n$ can be reduced, so that the focal lengths of the circular laser beams become equal. For example, as the incidence angle $\alpha n$ of the circular laser beam is larger, the inclination $\beta n$ of the circular laser beam reflected on the fifth reflecting surface 21a of the main mirror 21 is larger, and the focal length Fn is shorter. On the other hand, if the geometric optical aberration $\gamma n$ occurs, the reflection angle of the laser beam which has a larger diameter and is reflected on a position which is more distant from the optical axis OA becomes larger, and the inclination $\beta n$ of the circular laser beam reflected on the fifth reflecting surface 21a becomes smaller. As a result, the difference in the incidence angle $\alpha n$ is cancelled by the geometric optical aberration $\gamma n$, the focal lengths Fn of the circular laser beams become equal to each other, and the circular laser beams are condensed at one point. This makes it possible to reduce the emission area of the combined laser beam. As a result, the energy density and power density of the combined laser beam can be further increased.

Since the energy density of the combined laser beam is increased, a distance for which the combined laser beam can be emitted effectively can be increased. Specifically, FIG. 7A is an example of the graph showing the diameters of the circular laser beams on the fifth reflecting surface 21a, in a case where the circular laser beams do not overlap with each other on the fifth reflecting surface 21a. FIG. 7B is an example of the graph showing the diameters of the circular laser beams on the fifth reflecting surface 21a, in a case where the circular laser beams overlap with each other on the fifth reflecting surface 21a. In each of the graphs, a vertical axis indicates the outer diameter radius and the inner diameter radius of the circular laser beam, while a horizontal axis indicates a shaping optical unit number. The shaping optical unit numbers are assigned to the units 11 according to the order in which the unit 11 is closer to the beam condensing optical system 20. The unit 11 with a larger shaping optical unit number is located to be closer to the auxiliary mirror 22. In this case, six units 11 are used. In each of the graphs, circular marks represent the radiuses of the outer diameters of the circular laser beams on the fifth reflecting surface 21a, respectively, while rectangular marks represent the radiuses of the inner diameters of the circular laser beams on the fifth reflecting surface 21a, respectively. In the example of FIG. 7B, the differences $\Delta$ each of which is between the conical angle $\theta A$ of the first reflecting surface 15a and the conical angle $\theta B$ of the second reflecting surface 14a are set to 0.008, 0.014, 0.020, 0.026, 0.032, and 0.038, respectively, in the order of the shaping optical unit number (namely, the order in which the unit 11 is closer to the beam condensing optical system 20). FIG. 8 is a graph showing a relationship between the focal length and an energy density ratio. In FIG. 8, a vertical axis indicates the energy density ratio of the combined laser beam, while a horizontal axis indicates the focal length of the combined laser beam. This energy density ratio is defined as a ratio of the energy density of the combined laser beam in the example of FIG. 7B with respect to the energy density of the combined laser beam in the example of FIG. 7A, and is, for example, 2 to 4.5.

In a case where the circular laser beams do not overlap with each other, the width of each of the circular laser beams is smaller, as can be seen from the difference between the circular mark and the rectangular mark corresponding to each unit 11 in the example of FIG. 7A. In contrast, in a case where the circular laser beams overlap with each other, the width (cross-sectional area of the light flux) of each of the circular laser beams is larger, as can be seen from the difference between the circular mark and the rectangular mark corresponding to each unit 11 in the example of FIG. 7B. From this fact, in the example of FIG. 7B, the diameter of the condensed combined laser beam becomes smaller, and the energy density of the combined laser beam becomes higher. As a result, the energy density in a case where the focal length is set to be larger is attenuated less, in the combined laser beam of FIG. 7B than in the combined laser beam of FIG. 7A. For this reason, as shown in FIG. 8, the energy density ratio of the combined laser increases as the focal length of the combined laser beam increases. As should be understood from this, the combined laser beam with a higher energy density can make its focal length (namely, a distance for which the combined laser beam can be emitted effectively) longer.

(Embodiment 3)

In the above-described Embodiment 1 and Embodiment 2, the catoptric system including the pair of axicon mirrors 14, 15 is used as the unit 11. In contrast, in Embodiment 3, a transmission optical system is used as the unit 11. FIG. 9 is a view schematically showing the laser beam combining device 100 according to Embodiment 3. FIG. 10 is a view showing a relationship between conical angles $\theta C$, $\theta D$ of a pair of axicon lenses 51, 52. Now, with reference to FIGS. 9 and 10, the configuration of the laser beam combining device 100 will be described.

As shown in FIG. 9, each of the units 11 includes a pair of axicon lenses 51, 52 and the scraper mirror 16. The pair of axicon lenses 51, 52 are a first axicon lens 51 and a second axicon lens 52, and are made of a material with an equal refraction index. The first axicon lens 51 is a first axicon optical system, and is located to be closer to the laser light source 12 than the second axicon lens 52 is. The first axicon lens 51 has an incident surface (first incident surface 51a) which is a circular flat surface, and an emission surface (first emission surface 51b) which is a conical surface. The first emission surface 51b is the conical surface which magnifies the diameter of the incident laser beam and emits the circular laser beam. The second axicon lens 52 is a second axicon optical system, and is located between the first axicon lens 51 and the scraper mirror 16. The second axicon lens 52 has an incident surface (second incident surface 52a) which is a conical surface, and an emission surface (second emission surface 52b) which is a circular flat surface. The second incident surface 52a is the conical surface which reduces the diameter of the circular laser beam emitted (output) from the first axicon lens 51. The pair of axicon lenses 51, 52 are placed in such a manner that the first emission surface 51b and the second incident surface 52a face each other, and the axes of the cones of the first emission surface 51b and the second incident surface 52a conform to each other.

As shown in FIG. 10, the conical angle θC of the first emission surface 51b and the conical angle θD of the second incident surface 52a are obtuse angles, respectively. The conical angle θC is slightly larger than the conical angle θD and a difference between them is, for example, 0.005 to 0.5 degrees. The conical angle θC of the first emission surface 51b is twice as great as an angle θc formed between the rotational axis of the cone of the first emission surface 51b and the generating line of the cone of the first emission surface 51b. The conical angle θD of the second incident surface 52a is twice as great as an angle θd formed between the rotational axis of the cone of the second incident surface 52a and the generating line of the cone of the second incident surface 52a. Although in the present embodiment, the conical angle θC is larger the conical angle θD in each of the units 11, the conical angle θC may be equal to the conical angle θD in a first unit 11a. In this case, a difference Δ between the conical angle θC and the conical angle θD is zero.

As shown in FIG. 9, in the units 11, the difference Δ between the conical angle θC and the conical angle θD is set to be larger as the corresponding unit 11 is closer to the auxiliary mirror 22 (the difference Δ between the conical angle θC and the conical angle θD, of the unit 11 which is closer to the auxiliary mirror 22, is larger). In other words, the difference Δ of the (n−1)-th unit 11 is smaller than the difference Δ of the n-th unit 11 provided on the emission side of the third reflecting surface 16a. In the units 11, the pair of axicon lenses 51, 52 are placed in such a manner that a distance between the first emission surface 51b and the second incident surface 52a is larger as the corresponding unit 11 is closer to the auxiliary mirror 22 (distance between the first emission surface 51b and the second incident surface 52a, which correspond to the unit 11 which is closer to the auxiliary mirror 22, is larger). In the units 11, the diameter of the second axicon lens 52 is larger, as the corresponding unit 11 is closer to the auxiliary mirror 22.

The second through-hole 16b of the scraper mirror 16 is opened in a direction which is inclined at an angle of 45 degrees with respect to the third reflecting surface 16a. The diameter of the second through-hole 16b is set to be smaller than the inner diameter of the circular laser beam emitted (output) from the second emission surface 52b. The scraper mirror 16 is placed in such a manner that the center of the second through-hole 16b at the incident surface is located on the axis of the second incident surface 52a, the third reflecting surface 16a is inclined at an angle of 45 degrees with respect to the axis of the second incident surface 52a, and the second through-hole 16b is orthogonal to the axis of the second incident surface 52a.

In the above-described laser beam combining device 100, in each of the units 11, the solid laser beam is emitted from the laser light source 12. The solid laser beam enters the first axicon lens 51 through the first incident surface 51a, and is emitted (output) from the second emission surface 52b. At this time, the optical axis of the solid laser beam conforms to the axis of the first emission surface 51b. For this reason, the solid laser beam is line-symmetric with respect to the axis of the first emission surface 51b having the conical shape and is refracted at a constant angle irrespective of a distance from this axis. Thereby, the solid laser beam is converted into the circular laser beam (ring-shaped laser beam). The circular laser beam travels toward the second incident surface 52a while being magnified.

After that, the circular laser beam enters the second axicon lens 52 through the second incident surface 52a. At this time, the circular laser beam is line-symmetric with respect to the axis of the second incident surface 52a of the conical shape and is refracted at a constant angle irrespective of a distance from this axis. In this case, since the conical angle θC of the first emission surface 51b is slightly larger than the conical angle θD of the second incident surface 52a, a refraction angle at the first emission surface 51b is slightly smaller than a refraction angle at the second emission surface 52b. For this reason, the diameter of the circular laser beam is reduced while keeping the width of the ring-shaped cross-section constant.

The circular laser beam is emitted from the second emission surface 52b. The circular laser beam collides with the third reflecting surface 16a around the second through-hole 16b in the scraper mirror 16 and is reflected in a direction orthogonal to the axis of the second emission surface 52b. At this time, the centers of the third reflecting surfaces 16a of the units 11 are aligned on the guide line and the inclination angles of the third reflecting surfaces 16a are equal. For this reason, the circular laser beams reflected on the third reflecting surfaces 16a of the units 11 travel coaxially in a state in which the centers of the circles of their cross-sections conform to each other.

In the units 11, a distance between the first emission surface 51b and the second incident surface 52a is larger as the corresponding unit 11 is closer to the auxiliary mirror 22. For this reason, the diameter of the circular laser beam emitted from the unit 11 which is closer to the auxiliary mirror 22 is larger. Therefore, as can be seen from G4 of FIG. 9, the circular laser beams which have been just emitted from the units 11, respectively, have a shape in which their cross-sections have a concentric circle shape, and the n-th circular laser beam surrounds the (n−1)-th laser beam.

In the units 11, as the difference between the conical angle θC and the conical angle θD is larger, the angle (inclination) formed between the circular laser beam and the optical axis OA of the circular laser beam is larger. This difference is larger as the corresponding unit 11 is closer to the auxiliary mirror 22. For this reason, the circular laser beam emitted from the unit 11 which is closer to the auxiliary mirror 22 has a larger diameter and reduces the diameter with a larger degree. Therefore, the circular laser beams of the combined laser beam overlap with each other on the fourth reflecting surface 22a of the auxiliary mirror 22 and the fifth reflecting surface 21a of the main mirror 21. This combined laser beam is reflected and condensed on the concave fifth reflecting surface 21a, and is emitted from the laser combining device 100.

The retraction angles of the circular laser beams of the pair of axicon lenses 51, 52 are determined by the refraction indexes of the lens 51, 52, and the conical angles θC, θD.

For this reason, in the units 11, the conical angles θC, θD may be set to be equal, and a difference between the refraction indexes of the axicon lens 51, 52 may be changed according to the order in which the unit 11 is closer to the beam condensing optical system 20 so that the refraction angles of the circular laser beams can be changed.

(Embodiment 4)

In the above-described Embodiment 1 and Embodiment 2, the circular laser beams emitted from the units 11 have a concentric shape and are different from each other in the reduction amount of the outer diameter per unit travel distance. However, it is sufficient that the concentric circular laser beams get closer to each other and overlap with each other as they travel. For this reason, it is sufficient that the circular laser beams may be different from each other in the change amount of the outer diameter per unit travel distance. For example, this change amount may be an increase amount instead of the reduction amount. FIG. 11 is a view showing a relationship between the conical angles θC, θD of the pair of axicon mirrors 14, 15. Now, with reference to FIGS. 11 and 12, the configuration of the laser beam combining device 100 will be described.

As shown in FIG. 11, in the units 11, the pair of axicon mirrors 14, 15 are configured in such a manner that the conical angle θB of the second reflecting surface 14a is larger than the conical angle θA of the first reflecting surface 15a. A difference Δb between the conical angles θA, θB is, for example, 0.001 to 0.1 degrees and is smaller according to the order in which the unit 11 is closer to the beam condensing optical system 20. More specifically, the difference Δb of the (n−1)-th unit 11 is larger than the difference Δb of the n-th unit 11 provided on the emission side of the third reflecting surface 16a. In the present embodiment, the conical angles θA, θB are set in such a manner that the conical angle θB is constant, and the conical angle θA=θB−Δb is larger according to an order in which the unit 11 is closer to the beam condensing optical system 20. Alternatively, the conical angle θA may be constant and the conical angle θB may be smaller according to the order in which the unit 11 is closer to the beam condensing optical system 20, or both of the conical angle θA and the conical angle θB may be varied, so long as the difference Δb is smaller according to the order in which the unit 11 is closer to the beam condensing optical system 20. Although in the present embodiment, the conical angle θB is larger than the conical angle θA in each of the units 11, the conical angle θA and the conical angle θB may be equal in the unit 11 which is closest to the beam condensing optical system 20. In this case, the difference Δb is zero.

In the above-described embodiments, the conical angle of the second reflecting surface 14a is larger than that of the first reflecting surface 15a, and the difference Δb between the conical angles is set to be smaller according to the order in which the unit 11 is closer to the beam condensing optical system 20. Thereby, the outer diameter of the circular laser beam emitted from each of the units 11 increases as the circular laser beam travels, and the increase amount of the outer diameter of the circular laser beam per unit travel distance is smaller according to the order in which the unit 11 is closer to the beam condensing optical system 20. Thereby, the circular laser beams which are uncondensed (beams before being condensed) overlap with each other while having great widths. As a result, the energy density and power density of the combined laser beam at the emission position can be increased without increasing the size of the laser combining device 100 and while reducing the diameter of the condensed laser beam.

Figure 12C:
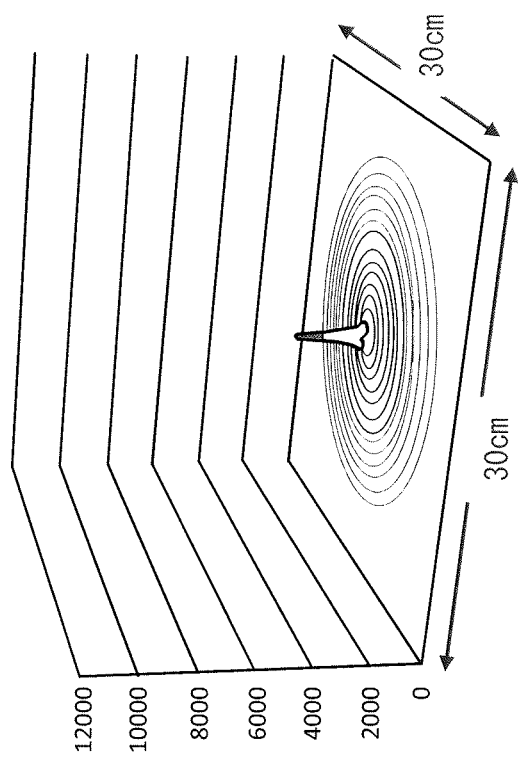
FIG. 12C is a graph showing the intensity distribution of the laser beam obtained by condensing the circular laser beams of FIGS. 12A and 12B.
Figure 12A:
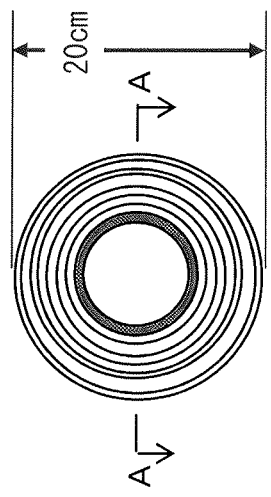
FIG. 12A is a view showing the intensity distribution of circular laser beams which are uncondensed (beams before being condensed) in a conventional laser beam combining device.
Figure 12B:
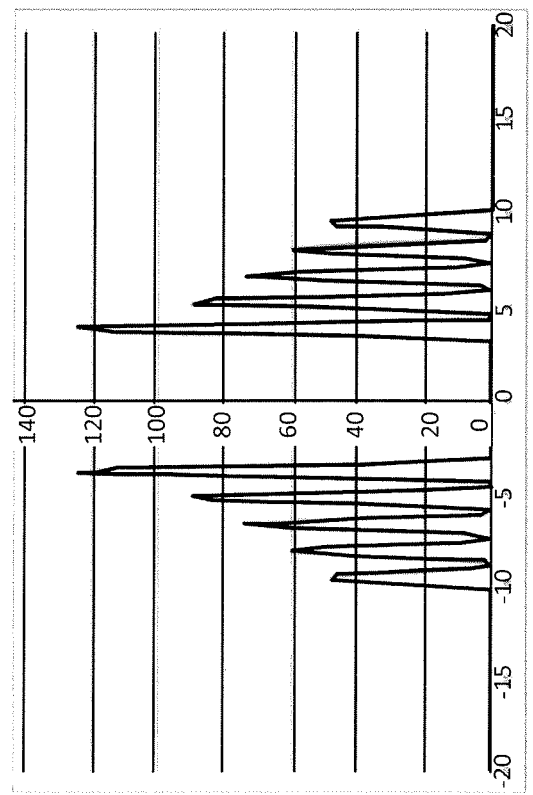
FIG. 12B is a view showing the intensity distribution of the circular laser beams, in a cross-section taken along line A-A of FIG. 12A.
Figure 13A:
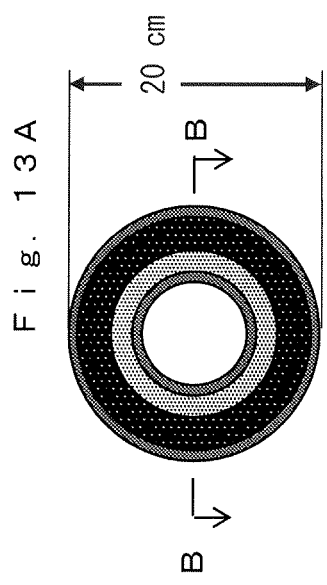
FIG. 13A is a view showing the intensity distribution of the circular laser beams which are uncondensed (beams before being condensed) in the laser beam combining device.
Figure 13C:
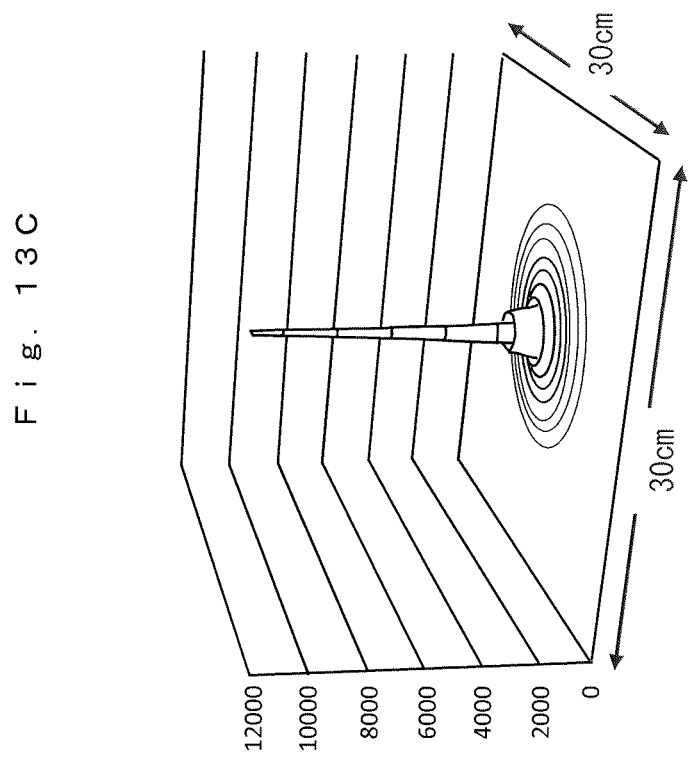
FIG. 13C is a graph showing the intensity distribution of the laser beam obtained by condensing the circular laser beams FIGS. 13A and 13B.
Figure 13B:
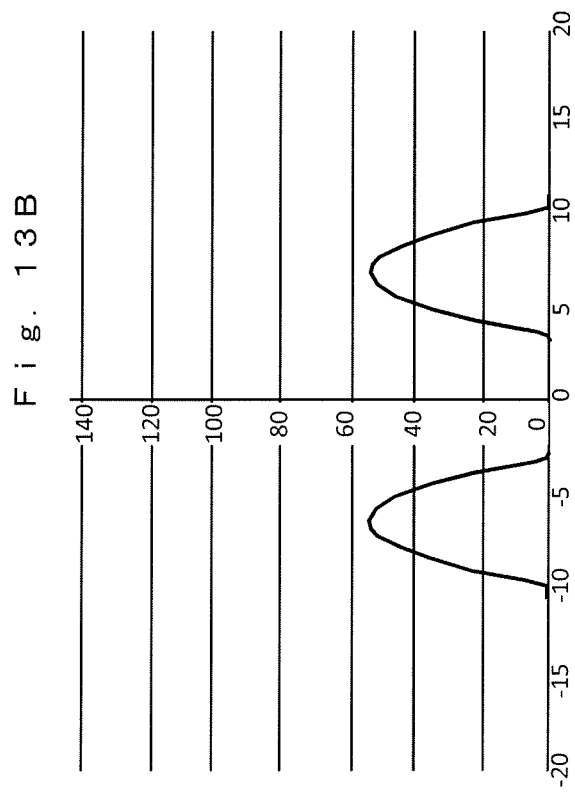
FIG. 13B is a view showing the intensity distribution of the circular laser beams, in a cross-section taken along line B-B of FIG. 13A.

FIGS. 12A to 12C show the intensity distributions of the circular laser beams in a conventional laser beam combining device. FIGS. 13A to 13C show the intensity distributions of the circular laser beams in the laser beam combining device 100 of the present embodiment. FIGS. 12A and 13A show the intensity distributions (near-field images) of the circular laser beams which are uncondensed (before being condensed), on the fifth reflecting surface 21a. FIG. 12B is a graph showing the intensity distribution of the conventional circular laser beams in the cross-section taken along line A-A of FIG. 12A, while FIG. 13B is a graph showing the intensity distribution of the conventional circular laser beams in the cross-section taken along line B-B of FIG. 13A. FIGS. 12C and 13C are graphs showing the intensity distributions (far-field images) of the laser beams obtained by condensing the circular laser beams. In FIGS. 12B and 13B, a vertical axis indicates the intensity, while a horizontal axis indicates a distance from the center of the laser beam. In FIGS. 12C and 13C, a vertical axis indicates the intensity. A distance between the fifth reflecting surface 21a and the condensing position of the circular laser beams is set to 1 km. The intensity distributions are results obtained by conducting simulation based on wave optics, when the wavelength of the laser beam output from the light source 12 is 1.064 μm.

In the conventional laser beam combining device, the conical angle θA of the first reflecting surface 15a and the conical angle θB of the second reflecting surface 14a are set equal. As shown in FIG. 12A, in the near-field image, the circular laser beams which are uncondensed have small widths, respectively, and are spaced apart from each other. FIG. 12B shows the intensities of the circular laser beams, respectively. As can be seen, the circular laser beam with a smaller diameter has a higher intensity. As shown in FIG. 12C, after the circular laser beams are condensed, many side lobes emerge around a main lobe in the condensed laser beam in the far field, and the intensity of the condensed laser beam is deconcentrated. Therefore, the condensing performance of the laser beams is low and the intensity of the main lobe is low.

In contrast, in accordance with the laser beam combining device of the present embodiment, as shown in FIG. 13A, the circular laser beams which are uncondensed have great widths, respectively, and overlap with each other in the near-field image. For this reason, as shown in FIG. 13B, the intensity of a portion (center in a width direction) at which the circular laser beams overlap with each other is high, and the intensity of portions which are closer to the ends (inner periphery and outer periphery of the ring-shaped cross-section) is lower. As shown in FIG. 13C, the intensity of the condensed laser beam in the far field is high, and is about 3.9 times as high as that of FIG. 13C. Thus, the power density and energy density at the target position can be increased.

In the above-described configuration, the circular laser beams emitted from the units 11 have a concentric shape and are different from each other in the increase amount of the outer diameter per unit travel distance. Alternatively, the outer diameter per unit travel distance, of a part of the plurality of circular laser beams may be increased, and the outer diameter per unit travel distance, of the remaining circular laser beams may be reduced, so long as the change amounts of the outer diameters of the circular laser beams per unit travel distance are different from each other, and the concentric circular laser beams get closer to each other and overlap with each other as they travel.

(Embodiment 5)

In the above-described Embodiment 4, the catoptric system including the pair of axicon mirrors 14, 15 is used as the unit 11. In contrast, in Embodiment 5, the transmission optical system is used as the unit 11. This transmission optical system is the same as that of Embodiment 2 except the relationship between the conical angles θC, θD of the pair of axicon lenses 51, 52, and the difference between the conical angles θC, θD. FIG. 14 is a view showing the relationship between conical angles θC, θD of the pair of axicon lenses 51, 52.

As shown in FIG. 14, the conical angle θC of the first emission surface 51b is smaller than the conical angle θD of the second incident surface 52b. This difference between the conical angles θC, θD is, for example, 0.005 to 0.5 degrees and is smaller according to the order in which the unit 11 is closer to the beam condensing optical system 20. In other words, the difference between the conical angles θC, θD in the (n−1)-th unit 11 is larger than that in the n-th unit 11 provided on the emission side of the third reflecting surface 16a. Although in the present embodiment, the conical angle θC is smaller than the conical angle θD in each of the units 11, the conical angle θC and the conical angle θD may be equal in the unit 11 which is closest to the beam condensing optical system 20. In this case, the difference Δ between the conical angles θC, θD is zero.

In the above-described embodiment, the conical angle of the first emission surface 51b is smaller than the conical angle of the second incident surface 52b, and the difference between the conical angles is made smaller according to the order in which the unit 11 is closer to the beam condensing optical system 20. Thereby, the outer diameter of the circular laser beam emitted from each of the units 11 increases as the circular laser beam travels, and the increase amount of the outer diameter of the circular laser beam per unit travel distance is smaller according to the order in which the unit 11 is closer to the beam condensing optical system 20. Thereby, the circular laser beams which are uncondensed (beams before being condensed) overlap with each other while having great widths. As a result, the energy density and power density of the combined laser beam at the emission position can be increased without increasing the size of the laser combining device 100 and while reducing the diameter of the condensed laser beam.

(Embodiment 6)

In all of the above-described embodiments, the catoptric system including the main mirror 21 and the auxiliary mirror 22 is used as the beam condensing optical system 20. However, the beam condensing optical system 20 is not limited to this so long as it condenses the circular laser beams emitted from the scraper mirrors 16. For example, a transmission optical system such as a single lens or a transmission-type telescope may be used as the beam condensing optical system 20. In this case, the difference between the conical angles of the first axicon optical system 15 and the second axicon optical system 14, and the difference between the conical angles of the first axicon optical system 51 and the second axicon optical system 52 are set so that the circular laser beams emitted from the scraper mirrors 16 of the units 11 overlap with each other on the emission surface of the beam condensing optical system 20.

(Embodiment 7)

In the above-described Embodiment 2, in order to improve the condensing performance of the combined laser beam, the curvature radius of the auxiliary mirror 22 is set so that the focal positions of the circular laser beams of the combined laser beam are made closer to each other. However, a method of improving the condensing performance of the combined laser beam is not limited to this. For example, the condensing performance of the combined laser beam can be improved by optimizing the curvature radius of the wave front of the laser beam which is emitted from the laser light source 12 and enters the axicon optical systems 14, 15, 51, 52 of the unit 11.

Specifically, the difference between the conical angles of the first axicon optical system 15 and the second axicon optical system 14, and the difference between the conical angles of the first axicon optical system 51 and the second axicon optical system 52, are made different according to the order in which the unit 11 is closer to the beam condensing optical system 20. This along with the manufacturing errors and geometric optical aberrations causes an unsuitable difference in the inclination between the circular laser beams reflected on the main mirror 21, and hence a difference in the focal length between the circular laser beams. In view of this, the wave front curvature radiuses of the laser beams emitted from the laser light sources 12, respectively, are set so that the focal lengths of the circular laser beams become equal. Thereby, the divergence angles of the laser beams which enter the axicon optical systems 14, 15, 51, 52 are adjusted to compensate a difference in the focal length. As a result, the focal lengths of the circular laser beams condensed by the main mirror 21 get close to each other, and the emission area of the combined laser beam is reduced. This makes it possible to further increase the energy density and power density of the combined laser beam.

In the above-described Embodiment 3 to Embodiment 6, the wave front curvature radiuses of the circular laser beams may be optimized as in Embodiment 7. This makes it possible to improve the condensing performance of the laser beams.

(Embodiment 8)

In all of the above-described embodiments, an image relay optical system may be used as the reduction optical system 30. The image relay optical system reduces the diameters of the circular laser beams emitted from the scraper mirrors 16, respectively, and emit the circular laser beams to the beam condensing optical system 20.

The image relay optical system with a reduction rate R (R is smaller than 1) reduces the sizes of the circular laser beams emitted from the scraper mirrors 16, respectively. This makes the spacing between the circular laser beams smaller by R times, and makes the inclinations (change rates of the outer diameters) of the circular laser beams larger by 1/R times. Now, a travel distance required for the circular laser beams which are emitted from the scraper mirrors 16 and are not reduced in size to overlap with each other is indicated by L1. In this case, a travel distance L2 required for the circular laser beams which are emitted from the scraper mirrors 16 and reduced in size by the image relay optical system to overlap with each other is represented by $R^2 L1$. Thus, since the travel distance L2 is shorter than the travel distance L1, the size of the laser beam combining device 100 can be reduced.

Further, if necessary, the circular laser beams which have been reduced in size by the image relay optical system may be magnified. In this configuration, the circular laser beams are reduced in size, then magnified, and thereafter emitted to the beam condensing optical system.

(Other Embodiment 1)

Although in the above-described Embodiment 1, the laser beam combining device 100 is provided with the guide light source 60, the guide light source 60 may be omitted. Further, the laser beam combining device 100 of Embodiment 1 and Embodiment 3 may be provided with the guide light source 60.

Although in all of the above-described embodiments, the difference between the conical angles θA, θB of the first axicon optical system 15 and the second axicon optical system 14, and the difference between the conical angles θC, θD of the first axicon optical system 51 and the second axicon optical system 52 are set to be larger according to the order in which the unit 11 is closer to the beam condensing optical system 20. Alternatively, the reflecting surface 16a of the scraper mirror 16 of each of the units 11 may be a surface of an elliptical cone shape for maintaining the circular shape of the circular laser beam reflected on the reflecting surface 16a, and the conical angle of the reflecting surface 16a of the elliptical cone shape may be set to be smaller according to the order in which the unit 11 is closer to the beam condensing optical system 20.

Specifically, the reflecting surface 16a of the scraper mirror 16 is the surface of the elliptical cone shape, which reduces the diameter of the circular laser beam emitted from the axicon optical system and changes the travel pathway of this circular laser beam. The reflecting surface 16a is concaved (depressed) in the elliptical cone shape, and its apex is located at the center of the scraper mirror 16. The major axis of the surface of the elliptical cone shape is made different between the units 11, and the minor axis of the surface of the elliptical cone shape is made different between the units 11. The conical angles on the major axis side and on the minor axis side, of the surface of the elliptical cone shape, which correspond to the unit 11 which is closer to the beam condensing optical system 20, are smaller. Alternatively, the reflecting surface 16a of the scraper mirror 16 of the first unit 11a may be formed by a flat surface. Although the reflecting surface 16a is the surface of the elliptical cone shape, the reflecting surface 16a may be a conical surface so long as the circular shape of the circular laser beam reflected on the reflecting surface 16a is maintained.

In the above-described configuration, the circular laser beam reflected on the reflecting surface 16a of the concaved elliptical cone shape travels while keeping its width constant and reducing its outer diameter. Since the conical angle of the reflecting surface 16a is smaller according to the order in which the unit 11 is closer to the beam condensing optical system 20, the reduction amount of the outer diameter of the circular laser beam per unit travel distance is larger according to the order in which the unit 11 is closer to the beam condensing optical system 20. Also, the outer diameter of the circular laser beam on the reflecting surface 16a is larger according to the order in which the unit 11 is closer to the beam condensing optical system 20. Therefore, the circular laser beams which enter the reflecting surfaces 16a and are uncondensed overlap with each other on the fourth reflecting surface 22a and the fifth reflecting surface 21a. Therefore, without increasing the diameter of the fifth reflecting surface 21a, the widths and inner/outer diameter ratios of the circular laser beams which are uncondensed can be increased. When these circular laser beams are reflected on the fifth reflecting surface 21a and condensed so that the widths and outer diameters of the circular laser beams are reduced, the diameter of the condensed laser beam can be reduced, and its energy density and power density can be increased.

The axicon optical system is the optical system having the conical surface which converts the incident laser beam into the circular laser beam and emits the circular laser beam. As the axicon optical system, for example, the convex axicon mirror 15, a pair of optical systems which are the convex axicon mirror 15 and the concave axicon mirror 14, the first axicon lens 51, and a pair of optical systems which are the first axicon lens 51 and the second axicon lens 52 are used.

The emission optical system which shapes the solid laser beam into the circular laser beam and emits the circular laser beam is not limited to the pair of axicon optical systems 14, 15, and the pair of axicon optical systems 51, 52. For example, instead of these axicon optical system, the scraper mirror may be used as the emission optical system. This scraper mirror has a flat plate shape and has a through-hole in a center portion thereof. Therefore, when the solid laser beam is emitted from the laser light source 12 to the scraper mirror, the center portion of this sold laser beam is removed and the solid laser beam is converted into the circular laser beam, while traveling through the scraper mirror.

Although in all of the above-described embodiments, the scraper mirror 16 is placed in such a manner that the third reflecting surface 16a is inclined at an angle of 45 degrees with respect to the axis of the second reflecting surface 14a, this inclination angle is not limited to 45 degrees. For example, the inclination angle may be changed according to the layout of the units 11. This makes it possible to more flexibly lay out the components in the laser beam combining device 100, and reduce the size of the laser beam combining device 100.

Although in all of the above-described embodiments, the combined laser beam has a shape in which the n-th circular laser beam surrounds the (n−1)-th circular laser beam, at a time point just after the combined laser beam has been emitted from the units 11. Alternatively, the combined laser beam may have a shape in which the n-th circular laser beam and the (n−1)-th circular laser beam overlap with each other, at a time point just after the combined laser beam has been emitted from the units 11.

Although in all of the above-described embodiments, the laser beam with a smallest diameter on the fifth reflecting surface 21a of the main mirror 21 is the circular laser beam with the ring-shaped cross-section, the laser beam with a smallest diameter may be the solid laser beam.

(Other Embodiment 2)

Although in the above-described other Embodiment 1, the reflecting surface 16a of the scraper mirror 16 is the surface of the elliptical cone shape which reduces the diameter of the circular laser beam emitted from the axicon optical system and changes the travel pathway of this circular laser beam. Alternatively, the reflecting surface 16a of the scraper mirror 16 may be the surface of the elliptical cone shape which magnifies the diameter of the circular laser beam emitted from the axicon optical system and changes the travel pathway of the circular laser beam. In this case, the reflecting surface 16a has the elliptical cone shape protruding. The conical angle of the reflecting surface 16a is larger according to the order in which the unit 11 is closer to the beam condensing optical system 20.

In this configuration, the circular laser beam reflected on the reflecting surface 16a travels while having a great width and magnifying (increasing) its outer diameter. In this case, the magnification (increase) amount of the outer diameter of the circular laser beam, per unit travel distance, is smaller according to the order in which the unit 11 is closer to the beam condensing optical system 20. The outer diameter of the circular laser beam on the reflecting surface 16a is larger according to the order in which the unit 11 is closer to the beam condensing optical system 20. Therefore, the circular laser beams which enter the reflecting surfaces 16a and are uncondensed overlap with each other. As a result, the energy density and power density of the combined laser beam at the emission position can be increased without increasing the size of the laser beam combining device 100 and while reducing the diameter of the condensed laser beam.

The above-described embodiments may be combined so long as they do not exclude each other.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The laser beam combining device of present invention is useful as a laser beam combining device, or the like, which is intended to realize high emission performances such as a high energy density and a high power density.

REFERENCE SIGNS LIST 100 laser beam combining device
11 shaping optical unit
14 concave axicon mirror (second axicon optical system, axicon optical system, emission optical system)
   14a second reflecting surface
   14b first through-hole
15 convex axicon mirror (first axicon optical system, axicon optical system, emission optical system)
   15a first reflecting surface
16 scraper mirror (catoptric system)
   16a third reflecting surface
   16b second through-hole
20 beam condensing optical system
21 main mirror
   21a fifth reflecting surface
   21b third through-hole
22 auxiliary mirror
   22a fourth reflecting surface
30 reduction optical system
51 first axicon lens (first axicon optical system, axicon optical system, emission optical system)
   51a first incident surface
   51b first emission surface
52 second axicon lens (second axicon optical system, axicon optical system, emission optical system)
   52a second incident surface
   52b second emission surface
60 guide light source

The invention claimed is:

1. A laser beam combining device comprising:
a plurality of shaping optical units which simultaneously emit a plurality of circular laser beams which are different from each other in a change amount of an outer diameter per unit travel distance; and
a beam condensing optical system which condenses the plurality of circular laser beams, wherein:
the plurality of shaping optical units are placed in such a manner that the plurality of circular laser beams have a concentric shape and overlap with each other on an emission surface of the beam condensing optical system.

2. The laser beam combining device according to claim 1, wherein each of the plurality of shaping optical units includes:
a first axicon optical system having a conical surface which magnifies a diameter of a laser beam which enters the first axicon optical system and emits the circular laser beam;
a second axicon optical system having a conical surface which reduces a diameter of the circular laser beam emitted from the first axicon optical system; and
a catoptric system which changes a travel pathway of the circular laser beam emitted from the second axicon optical system,
wherein at least one of a conical angle of the first axicon optical system and a conical angle of the second axicon optical system is made different between the plurality of shaping optical units, and
wherein the catoptric system of each of the plurality of shaping optical units emits the circular laser beam in such a manner that the circular laser beam which enters the catoptric system is concentric with the circular laser beam emitted from the catoptric system of another shaping optical unit included in the plurality of shaping optical units.

3. The laser beam combining device according to claim 2, wherein the first axicon optical system is a convex axicon mirror having a reflecting surface protruding in a conical shape,
wherein the second axicon optical system is a concave axicon mirror which has a reflecting surface which faces the reflecting surface of the convex axicon mirror and is concaved in a conical shape, and a hole penetrating the concave axicon mirror from the reflecting surface of the concave axicon mirror to a surface which is on an opposite side of the reflecting surface of the concave axicon mirror, and
wherein the catoptric system is a scraper mirror which is placed between the convex axicon mirror and the concave axicon mirror, and has a reflecting surface which is inclined with respect to an optical axis of the circular laser beam emitted from the concave axicon mirror, and a hole penetrating the scraper mirror from the reflecting surface of the scraper mirror to a surface which is on an opposite side of the reflecting surface of the scraper mirror.

4. The laser beam combining device according to claim 3, wherein in each of the plurality of shaping optical units, a conical angle of the concave axicon mirror is smaller than a conical angle of the convex axicon mirror, and
wherein a difference between the conical angle of the concave axicon mirror and the conical angle of the convex axicon mirror in each of the plurality of shaping optical units is smaller than a difference between the conical angle of the concave axicon mirror and the conical angle of the convex axicon mirror in the shaping optical unit provided on an emission side of the scraper mirror of the each of the plurality of shaping optical units.

5. The laser beam combining device according to claim 3, wherein in each of the plurality of shaping optical units, a conical angle of the concave axicon mirror is larger than a conical angle of the convex axicon mirror, and
wherein a difference between the conical angle of the concave axicon mirror and the conical angle of the convex axicon mirror in each of the plurality of shaping optical units is larger than a difference between the conical angle of the concave axicon mirror and the conical angle of the convex axicon mirror in the shaping optical unit provided on an emission side of the scraper mirror of the each of the plurality of shaping optical units.

6. The laser beam combining device according to claim 2, wherein the first axicon optical system is a first axicon lens having an emission surface protruding in a conical shape, wherein the second axicon optical system is a second axicon lens having an incident surface facing the emission surface of the first axicon lens and protruding in the conical shape, and wherein the catoptric system is a scraper mirror which is placed in such a manner that the second axicon lens is interposed between the scraper mirror and the first axicon lens, and has a reflecting surface which is inclined with respect to an optical axis of the circular laser beam emitted from the second axicon lens, and a hole penetrating the scraper mirror from the reflecting surface of the scraper mirror to a surface which is on an opposite side of the reflecting surface of the scraper mirror.

7. The laser beam combining device according to claim 6, wherein a conical angle of the first axicon lens is larger than a conical angle of the second axicon lens, and wherein a difference between the conical angle of the first axicon lens and the conical angle of the second axicon lens in each of the plurality of shaping optical units is smaller than a difference between the conical angle of the first axicon lens and the conical angle of the second axicon lens in the shaping optical unit provided on an emission side of the scraper mirror of the each of the plurality of shaping optical units.

8. The laser beam combining device according to claim 6, wherein a conical angle of the first axicon lens is smaller than a conical angle of the second axicon lens, and wherein a difference between the conical angle of the first axicon lens and the conical angle of the second axicon lens in each of the plurality of shaping optical units is larger than a difference between the conical angle of the first axicon lens and the conical angle of the second axicon lens in the shaping optical unit provided on an emission side of the scraper mirror of the each of the plurality of shaping optical units.

9. The laser beam combining device according to claim 2, further comprising:

a beam condensing optical system which condenses the circular laser beams emitted from the catoptric systems, wherein a difference between the conical angle of the first axicon optical system and the conical angle of the second axicon optical system in each of the plurality of shaping optical units is set so that the circular laser beams emitted from the catoptric systems of the plurality of shaping optical units overlap with each other on an emission surface of the beam condensing optical system.

10. The laser beam combining device according to claim 9, wherein the beam condensing optical system includes:

an auxiliary mirror having a reflecting surface which magnifies diameters of the circular laser beams emitted from the catoptric systems, and a main mirror having a reflecting surface which condenses the circular laser beams emitted from the auxiliary mirror, wherein a difference between the conical angle of the first axicon optical system and the conical angle of the second axicon optical system in each of the plurality of shaping optical units is set so that the circular laser beams emitted from the catoptric systems of the plurality of shaping optical systems overlap with each other on the reflecting surface of the main mirror.

11. The laser beam combining device according to claim 9, further comprising:

an image relay optical system which reduces diameters of the circular laser beams emitted from the catoptric systems and emits the circular laser beams to the beam condensing optical system.

12. The laser beam combining device according to claim 2, wherein wave front curvature radiuses of the circular laser beams are set to compensate a difference between focal lengths of the circular laser beams, the difference occurring due to a difference between the conical angle of the first axicon optical system and the conical angle of the second axicon optical system in each of the plurality of shaping optical units.

13. The laser beam combining device according to claim 2, further comprising:

a guide light source which emits a visible light ray along an optical axis of the circular laser beams emitted from catoptric systems.

14. The laser beam combining device according to claim 1, wherein each of the plurality shaping optical units includes:

an emission optical system which emits the circular laser beam; and a catoptric system having a surface of an elliptical cone shape which changes a diameter of the circular laser beam emitted from the emission optical system and changes a travel pathway of the circular laser beam, wherein a conical angle on a major axis side of the surface of the elliptical cone shape of the catoptric system is made different between the plurality shaping optical units, and a conical angle on a minor axis side of the surface of the elliptical cone shape of the catoptric system is made different between the plurality shaping optical units, and wherein the catoptric system of each of the plurality of shaping optical units emits the circular laser beam in such a manner that the circular laser beam which enters the catoptric system is concentric with the circular laser beam emitted from the catoptric system of another shaping optical unit included in the plurality of shaping optical units.

15. The laser beam combining device according to claim 1, wherein the plurality of shaping optical units each receive laser light from a different laser light source.

16. The laser beam combining device according to claim 1, wherein the plurality of circular laser beams overlap with each other on the emission surface while maintaining ring-shaped cross-sections.

* * * * *